US012654794B2

(12) United States Patent
Dunlap et al.

(10) Patent No.: US 12,654,794 B2
(45) Date of Patent: Jun. 16, 2026

(54) HEIGHT ADJUSTABLE SEAT POSTS FOR BICYCLES AND SPACERS FOR HEIGHT ADJUSTABLE SEAT POSTS

(71) Applicant: SRAM, LLC, Chicago, IL (US)

(72) Inventors: Charles Dunlap, Colorado Springs, CO (US); Robert Moore, Colorado Springs, CO (US); Kevin Jasper, Spearfish, SD (US); Christopher Golkiewicz, Colorado Springs, CO (US); Jace Doan, Spearfish, SD (US)

(73) Assignee: SRAM, LLC, Chicago, IL (US)

( * ) Notice: Subject to any disclaimer, the term of this patent is extended or adjusted under 35 U.S.C. 154(b) by 105 days.

(21) Appl. No.: 18/537,068

(22) Filed: Dec. 12, 2023

(65) Prior Publication Data

US 2025/0187687 A1      Jun. 12, 2025

(51) Int. Cl.
B62J 1/08          (2006.01)

(52) U.S. Cl.
CPC ............ B62J 1/08 (2013.01); B62J 2001/085 (2013.01)

(58) Field of Classification Search
CPC .............................. B62J 1/08; B62J 2001/085
See application file for complete search history.

(56) References Cited

U.S. PATENT DOCUMENTS

| | | | |
|---|---|---|---|
| 10,189,522 B2 * | 1/2019 | Pittens | B62J 1/08 |
| 10,974,781 B2 * | 4/2021 | Staples | B62J 1/08 |
| 11,066,118 B2 | 7/2021 | Katsuki | |
| 11,661,129 B2 * | 5/2023 | Chambers | B62J 1/08 |
| | | | 297/199 |
| 11,661,130 B2 * | 5/2023 | Quenzer | B62J 1/08 |
| | | | 297/215.13 |
| 11,780,521 B2 | 10/2023 | Dubois | |
| 12,179,870 B2 * | 12/2024 | Dunlap | B62J 1/06 |
| 12,269,547 B2 * | 4/2025 | Jordan | B62J 11/19 |
| 12,291,297 B2 * | 5/2025 | Chambers | B62J 1/08 |
| 2001/0006301 A1 | 7/2001 | Faltings | |
| 2023/0234661 A1 | 7/2023 | Holaday | |

(Continued)

FOREIGN PATENT DOCUMENTS

| | | |
|---|---|---|
| TW | 202340009 | 10/2023 |

OTHER PUBLICATIONS

Spratt, Ed, "TranzX's New Dropper Has Adjustable Travel & An Integrated Seat Post Clamp", Website, Feb. 26, 2021, https://www.pinkbike.com/news/tranzxs-new-integrated-travel-adjust-dropper-post-will-fit-any-frame.html—Last Checked Dec. 12, 2023.

*Primary Examiner* — Philip F Gabler

(57)          ABSTRACT

Height adjustable seat posts for bicycles are described herein. An example seat post includes an upper tube and a lower tube are configured in a telescopic arrangement and moveable between at least a first position and a second position. The seat post includes an upper sealhead, a lower sealhead, a shaft coupled to the lower tube and extending through the lower sealhead and into the upper tube, and a piston in the upper tube and coupled to the shaft. The piston divides the upper tube into a first chamber between the piston and the upper sealhead and a second chamber between the piston and the lower sealhead. The seat post also includes a spacer in the second chamber between the piston and the lower sealhead to reduce a length of the height adjustable seat post in at least one of the first and second positions.

22 Claims, 11 Drawing Sheets

(56)　　　　　　　References Cited

U.S. PATENT DOCUMENTS

| | | | |
|---|---|---|---|
| 2023/0264771 A1 | 8/2023 | Dunlap | |
| 2024/0076007 A1* | 3/2024 | Winefordner | B62J 1/08 |
| 2024/0367740 A1* | 11/2024 | Chuang | B62J 1/08 |
| 2024/0417013 A1* | 12/2024 | Dunlap | F16F 9/0272 |
| 2025/0042490 A1* | 2/2025 | Dunlap | B62J 1/08 |
| 2025/0042491 A1* | 2/2025 | Watson | B62K 19/36 |
| 2025/0050957 A1* | 2/2025 | Holaday | B62J 1/08 |

* cited by examiner

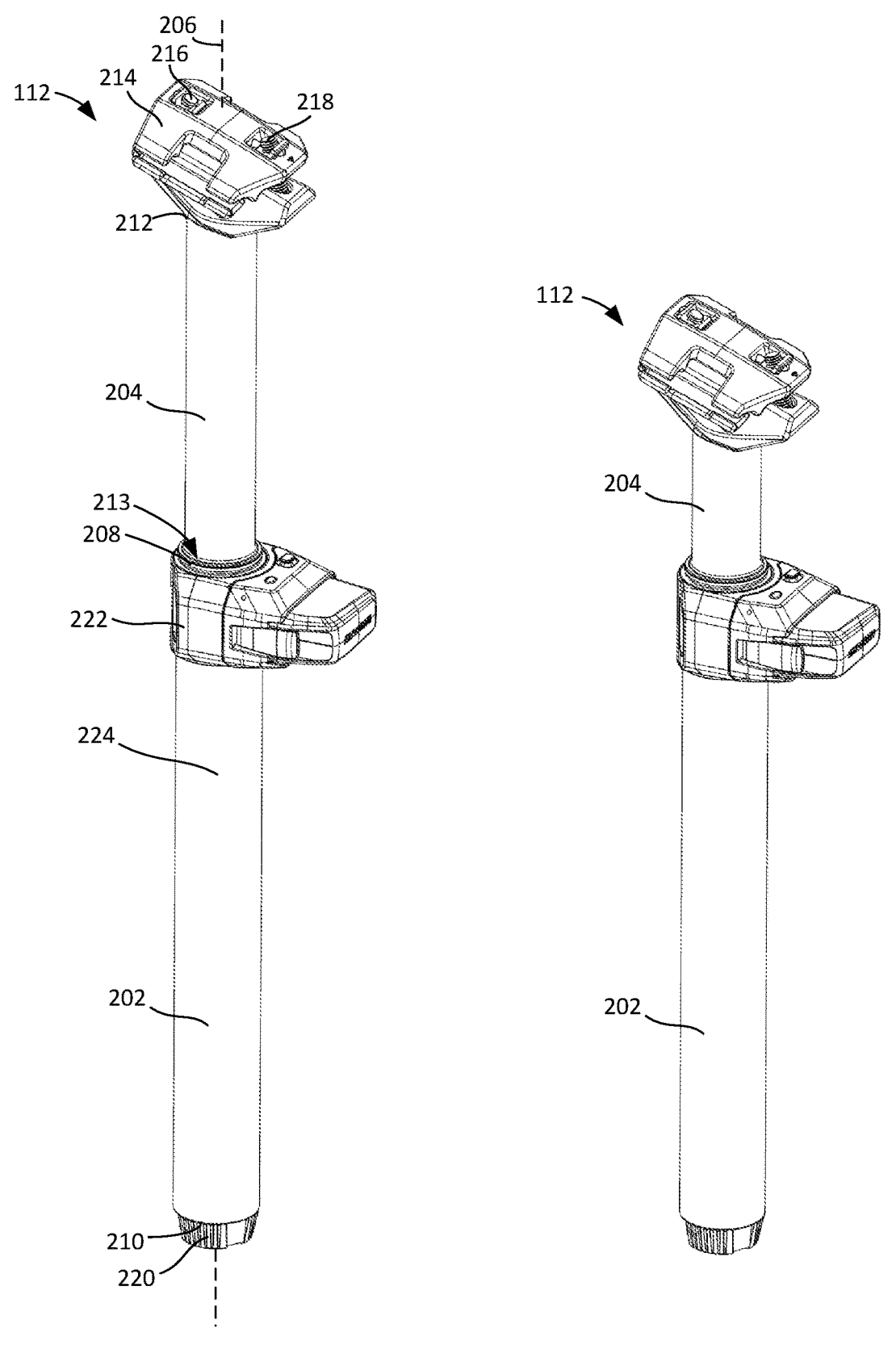
FIG. 2          FIG. 3

CONTROL HOUSING 402

PROCESSOR CIRCUITRY 408

WIRELESS COMMUNICATION DEVICE 410

208

222

402

400

404

406a

406b

202

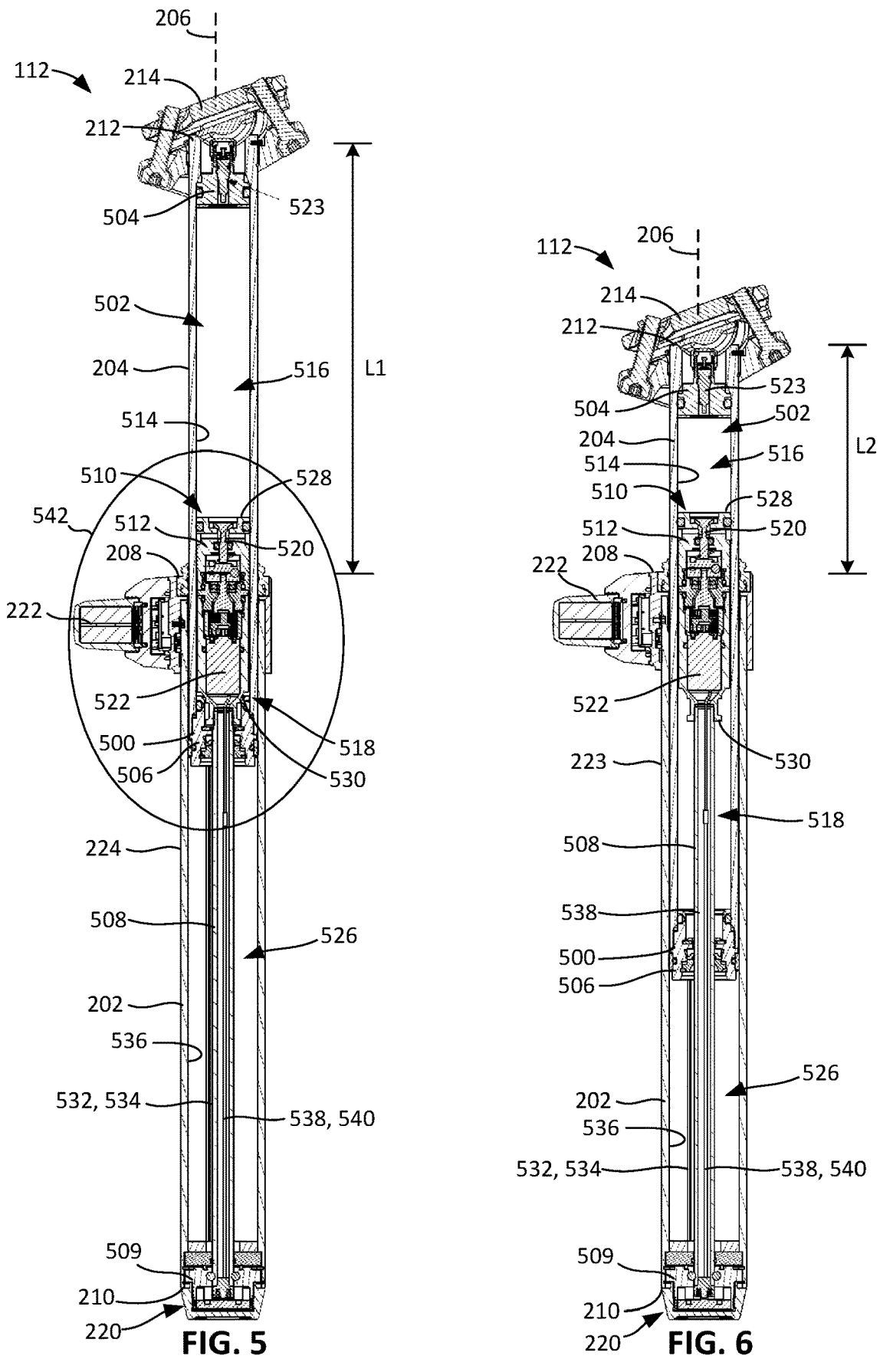
FIG. 5          FIG. 6

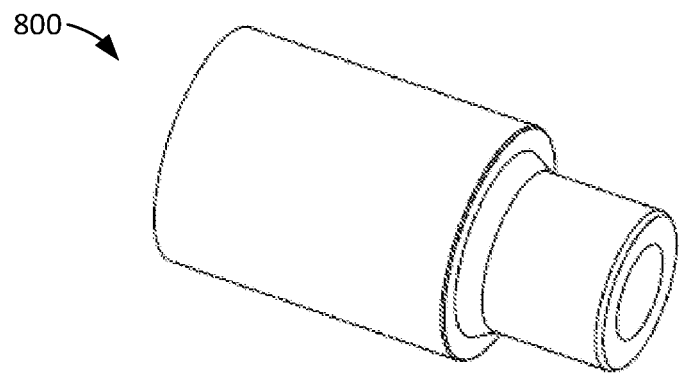
FIG. 12
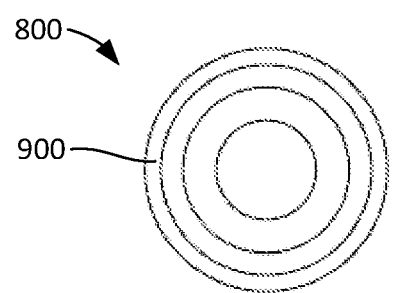
FIG. 13
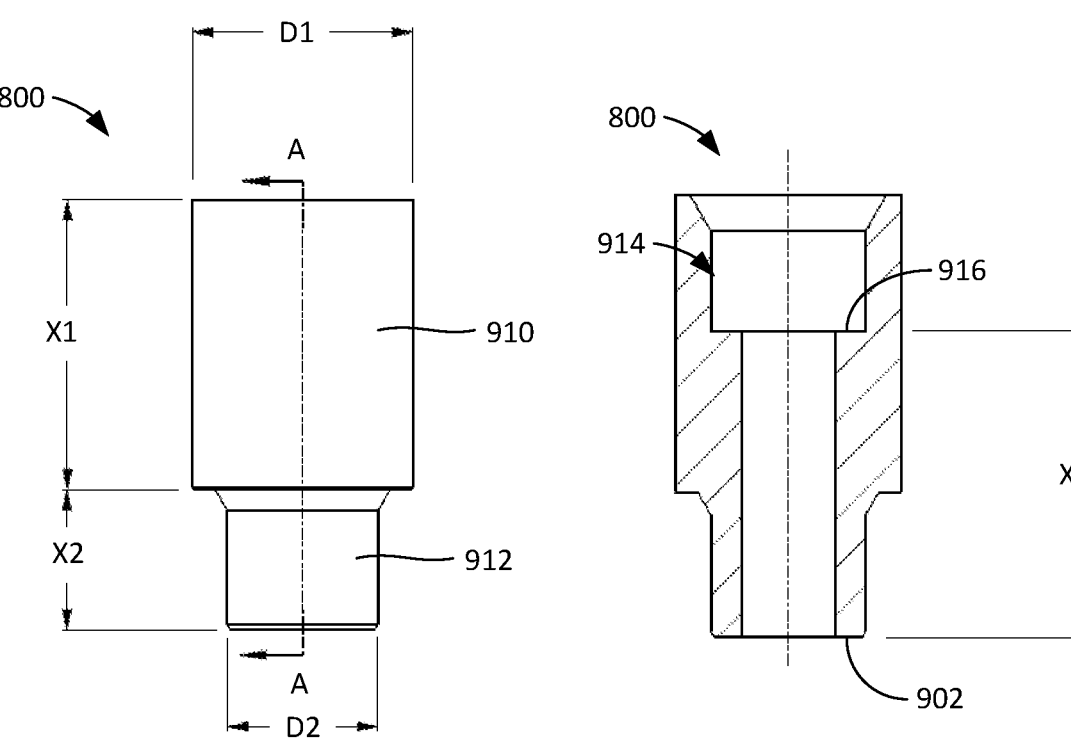
FIG. 14          FIG. 15

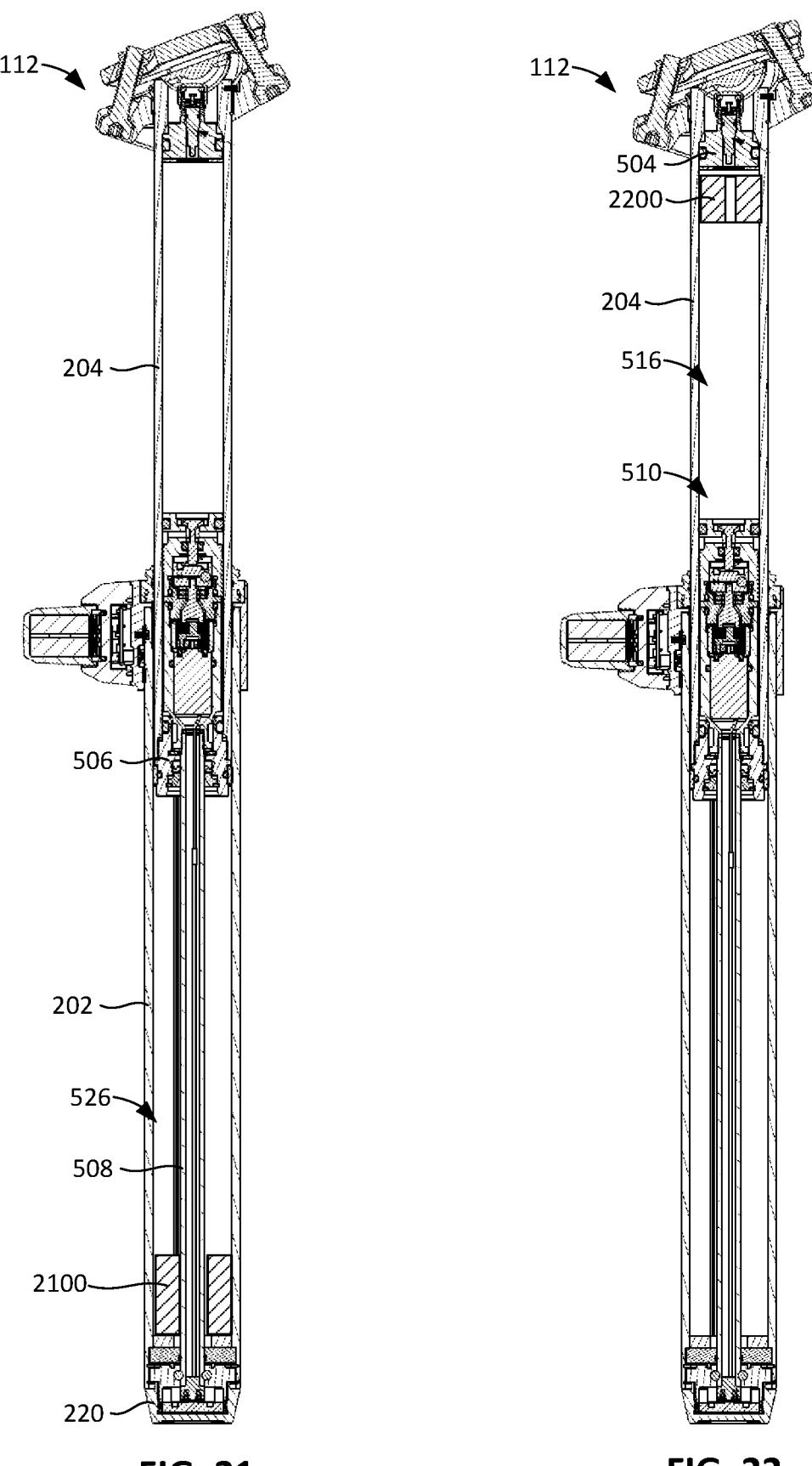
FIG. 21                    FIG. 22

1

HEIGHT ADJUSTABLE SEAT POSTS FOR BICYCLES AND SPACERS FOR HEIGHT ADJUSTABLE SEAT POSTS

FIELD OF THE DISCLOSURE

This disclosure relates generally to bicycle components and, more specifically, to height adjustable seat posts for bicycles and spacers for height adjustable seat posts.

BACKGROUND

Bicycles are known to have a seat or saddle to support a rider in a seated position. The seat is typically connected to the bicycle frame by a seat post. On most bicycles, the seat post can be manually adjusted to raise or lower the height of the seat to accommodate riders of different heights. The height may also be adjusted to accommodate different riding conditions. Typically, the seat post is mechanically clamped to a tube of the bicycle frame. When the clamp is released, the seat and post are slidable up and down relative to the tube of the bicycle frame to adjust the height of the seat. On some recent higher end bicycles, the seat post is height adjustable during riding of the bicycle by employing some type of hydraulic assist mechanism. For example, manually actuated hydraulic height adjustable or "dropper" seat posts may use a hydraulic pressure differential within the post and require manual operation to adjust the seat post height. Some products may use ANT+ wireless communication technology allowing the rider to wirelessly adjust the seat post.

SUMMARY

An example height adjustable seat post for a bicycle includes an upper tube to be coupled to a seat. The upper tube has an upper end and a lower end opposite the upper end. The height adjustable seat post includes a lower tube to be coupled to a frame of the bicycle. The upper tube and the lower tube are configured in a telescopic arrangement and moveable between at least a first position and a second position. The height adjustable seat post includes an upper sealhead coupled to the upper tube at or near the upper end, a lower sealhead coupled to the upper tube at or near end of the lower end, a shaft coupled to the lower tube and extending through the lower sealhead and into the upper tube, and a piston in the upper tube, the piston coupled to the shaft. The piston divides the upper tube into a first chamber between the piston and the upper sealhead and a second chamber between the piston and the lower sealhead. The height adjustable seat post also includes a spacer in the second chamber between the piston and the lower sealhead to reduce a length of the height adjustable seat post in at least one of the first and second positions.

An example apparatus for a bicycle includes a height adjustable seat post including an upper tube and a lower tube configured in a telescopic arrangement and moveable between at least a first position and a second position. The upper tube extends outward from the lower tube a first length in the first position. The height adjustable seat post includes a lower sealhead in the upper tube at or near the lower end, a shaft coupled to the lower tube and extending through the lower sealhead and into the upper tube, and a piston in the upper tube, the piston coupled to the shaft. The piston divides the upper tube into a first chamber and a second chamber. The second chamber is defined between the piston and the lower sealhead. The apparatus also includes a spacer having a first end, a second end, and a central channel extending between the first and second ends. The spacer is sized to be installed in the second chamber of the height adjustable seat post with the shaft extending through the central channel, and wherein, when the spacer is installed in the second chamber of the height adjustable seat post, the upper tube extends outward from the lower tube a second length in the first position, the second length being less than the first length.

BRIEF DESCRIPTION OF THE DRAWINGS

FIG. 2 is a side view of an example height adjustable seat post in a fully extended position.

FIG. 3 is a side view of the example height adjustable seat post of FIG. 2 in a partially contracted position.

FIG. 5 is a cross-sectional view of the example height adjustable seat post of FIG. 2 in the fully extended position.

FIG. 6 is a cross-sectional view of the example height adjustable seat post of FIG. 3 in the partially contracted position.

FIG. 12 is a perspective view of the example spacer shown in FIG. 8.

FIG. 13 is a top view of the example spacer of FIG. 12.

FIG. 14 is a side view of the example spacer of FIG. 12.

FIG. 15 is a cross-sectional view of the example spacer of FIG. 14 taken along line A-A.

FIG. 21 is a cross-sectional view of the example height adjustable seat post of FIG. 2 and including an example spacer in an example lower chamber of an example lower tube of the example height adjustable seat post.

FIG. 22 is a cross-sectional view of the example height adjustable seat post of FIG. 2 and including an example spacer in an example positive chamber in the example height adjustable seat post.

The figures are not to scale. Instead, the thickness of the layers or regions may be enlarged in the drawings. In general, the same reference numbers will be used throughout the drawing(s) and accompanying written description to refer to the same or like parts.

Figure 1:
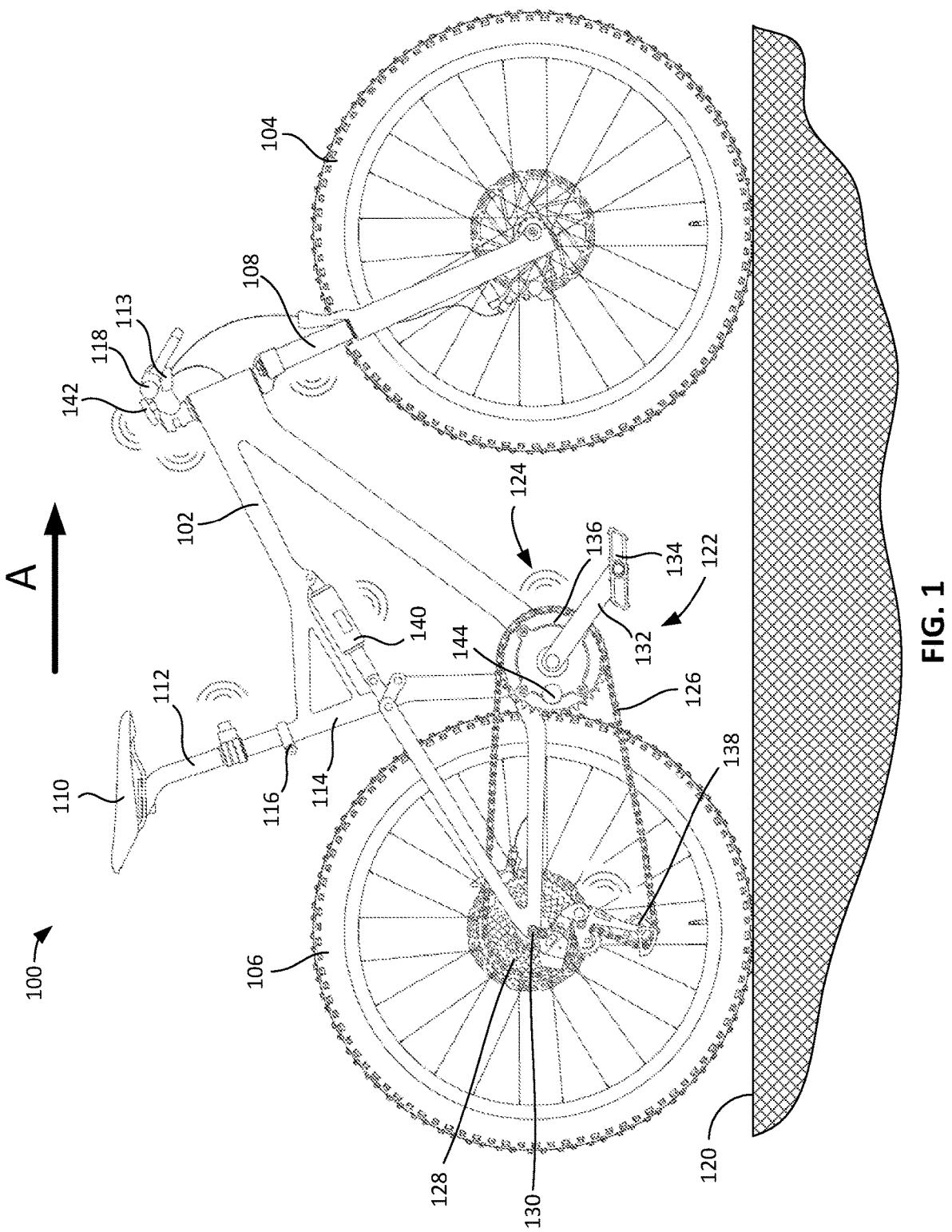
FIG. 1 is a side view of an example bicycle that may employ any of the example height adjustable seat posts disclosed herein.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Some modern bicycles include height adjustable seat posts, often referred to as dropper seat posts. This type of seat post allows a rider to change the height of their seat while riding the bicycle. For example, the rider can actuate a seat post actuator on the handlebars and then push downward on the seat (e.g., with their bottom) to contract or compress the seat post, which thereby lowers the height of the seat. When the rider stops actuating the seat post actuator, the seat post is maintained in the contracted position. Then, when the rider desires to raise the seat, the rider can actuate the seat post actuator again and the seat post extends or expands to move the seat back to the original height. This lowering ability can be advantageous when the rider is about to ride the bicycle down a steep decline. For instance, when riding down a decline, it is often desired to lower the seat so that the rider can stand up and move their body toward the rear of the bicycle (for better weight distribution) without the seat hitting their bottom. This lowering ability can also be used to lower the seat before the rider encounters an incline, where the rider typically stands up and peddles. This adjustability can be used in many other scenarios as well.

Height adjustable seat posts include an upper tube and a lower tube that are configured in a telescopic arrangement. The lower tube is inserted into the bicycle frame and secured via a clamp. The upper tube extends upward from the lower tube and supports the seat or saddle. The upper tube is moveable into and out of the lower tube between a fully extended position, also referred to as top-out position, and a fully contracted position, also referred to as a bottom-out position. These height adjustable seat posts have a fixed stroke or travel range between the fully extended position and the fully contracted position that is set by the internal components and size of components of the seat post. For example, typical seat posts have a stroke range of 50 millimeters (mm) to 250 mm. While riding the bicycle, the rider can activate the seat post (e.g., by pushing a seat post actuation button) to enable the upper tube to be pushed into the lower tube to lower the height of the seat. The seat post can be locked at any position between the fully extended position and the fully contracted position. When the rider desires to raise the seat, the rider can stand up on the pedals and activate the seat post. The seat post automatically expands back to the fully extended position. Therefore, the seat post established a certain top-out height for the seat when the seat post is in the fully extended position. However, even when the lower tube is fully inserted into the bicycle frame (e.g., the upper collar is against the bicycle frame), the seat height in the fully extended position may be too high for some riders to properly or comfortably ride the bicycle. From example, some shorter riders or riders with small inseam sizes may desire the seat post to top-out at a lower height.

Disclosed herein are example height adjustable seat posts with example spacers that can be used to reduce the overall height or length of the seat post when in the fully extended position. This enables the seat to be topped out at a lower height when in the fully extended position, which is advantageous for certain riders. In some examples, a seat post can be pre-assembled with a spacer. In other examples, the seat post and one or more spacers can be sold as a kit or assembly. Then, a user or rider can install the spacers as desired on their own.

An example height adjustable seat post disclosed herein includes an upper tube and a lower tube that are configured in a telescopic arrangement and moveable between a fully extended (top-out) position and a fully contracted (bottom-out) position. The lower tube is coupled or mounted to the bicycle frame, and the seat is coupled to the upper tube. The upper tube can slide relative to the lower tube to adjust the height of the seat. The upper tube is sealed on both ends by upper and lower sealheads to form a pneumatic chamber filled with a pressurized gas (e.g., air, nitrogen). In some examples, the upper sealhead includes a fill valve (e.g., a Schrader valve) that can be used to add or remove pressurized gas from the pneumatic chamber. The seat post includes a shaft coupled to the lower tube and extending into the upper tube. The seat post includes a piston assembly disposed in the upper tube and coupled to the shaft. The piston assembly includes a piston that divides the pneumatic chamber into an upper chamber (a positive gas chamber) and a lower chamber (a negative gas chamber). The upper chamber biases the upper and lower tubes away from each other and the lower chamber biases the upper and lower tubes toward each other. The piston assembly includes a valve that controls the flow of fluid across the piston between the upper and lower chambers. When the valve is in a closed state, the valve blocks or prevents gas flow between the two chambers. With respect to the terms "block" or "prevent," for purposes of the following discussion, the terms "block" or "prevent" refer to the most restricted gas flow attainable or desirable. Thus, in one example, the terms "block" or "prevent" mean a stoppage of all gas flow between the two chambers. However, in another example, the terms "block" or "prevent" mean substantially all gas flow is stopped between the two chambers. The pressure in the upper pneumatic chamber is sufficient to support the weight of the rider. When it is desired to raise or lower the seat, the valve is switched to an open state, which allows gas flow across the piston between the upper and lower chambers. This enables the rider to move the upper tube upward or downward relative to the lower tube, thereby raising or lowering the height of the seat.

When the seat post is expanding or lengthening to the fully extended position, the upper tube moves out of the lower tube and, thus, the piston moves toward the lower sealhead. In known seat posts, the piston may contact or engage the lower sealhead, which stops the seat post from expanding and thereby defines the fully extended (top-out) position. Often, a top-out bumper is used to cushion the stop. In the examples disclosed herein, the seat post includes a spacer in the lower chamber between the piston and the lower sealhead. The spacer reduces the amount of travel of the piston toward the lower sealhead. When the seat post is expanding or lengthening, the piston eventually engages a top end of the spacer, while the bottom end of the spacer is engaged with the lower sealhead (and/or bumper on the lower sealhead). As such, the piston is stopped (e.g., against the lower sealhead and/or the top-out bumper) at an earlier location along its travel stroke. This reduces the overall height or length of the seat post in the fully extended position. As such, the seat or saddle has a lower or reduced height in the fully extended position, which is advantageous and/or desirable for certain riders. For example, without the spacer, the seat post may have a first length in the fully extended position, and with the spacer, the seat post may have a second length in the fully extended position, which is less than the first length. The spacer can have any height or length desired. In some examples disclosed herein, multiple spacers can be arranged in a stacked configuration in the lower chamber. A different number of spacers results in a different height reduction.

In some examples, a seat post can be pre-assembled with a spacer. In other examples, the spacer(s) can be provide separately from the seat post. For example, the seat post and one or more spacers can be sold as a kit or assembly, or sold as completely separate parts. Then, a user or rider can install one or more of the spacers as desired on their own. This allows a manufacturer to manufacture one size of seat post that can be easily adjusted to the height/length desired by the rider.

Turning now to the figures, FIG. 1 illustrates one example of a human powered vehicle on which the example seat posts disclosed herein can be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. A front and/or forward riding direction or orientation of the bicycle 100 is indicated by the direction of the arrow A in FIG. 1. As such, a forward direction of movement for the bicycle 100 is indicated by the direction of arrow A.

In the illustrated example of FIG. 1, the bicycle 100 includes a seat 110 (sometimes referred to as a saddle) coupled to the frame 102 (e.g., near the rear end of the frame 102 relative to the forward direction A) via a seat post 112 constructed in accordance with the teachings of the present disclosure. In the illustrated example, the seat post 112 is coupled to a seat tube 114 of the frame 102. In some examples, the seat post 112 is coupled to the seat tube 114 by a clamp 116 that surrounds the opening in the seat tube 114. The seat post 112 is height adjustable to raise or lower the seat 110. In some examples, the bicycle 100 includes a seat post actuation button 113 to control the seat post 112, example operations of which are disclosed in further detail herein. The bicycle 100 also includes handlebars 118 coupled to the frame 102 and the front fork 108 (e.g., near a forward end of the frame 102 relative to the forward direction A) for steering the bicycle 100. In some examples, the seat post actuation button 113 is mounted on the handlebars 118 to enable a rider to interact with the seat post actuation button 113 while riding the bicycle 100. The bicycle 100 is shown on a riding surface 120. The riding surface 120 may be any riding surface such as the ground (e.g., a dirt path, a sidewalk, a street, etc.), a man-made structure above the ground (e.g., a wooden ramp), and/or any other surface.

In the illustrated example, the bicycle 100 has a drivetrain 122 that includes a crank assembly 124. The crank assembly 124 is operatively coupled via a chain 126 to a sprocket assembly 128 mounted to a hub 130 of the rear wheel 106. The crank assembly 124 includes at least one, and typically two, crank arms 132 and pedals 134, along with at least one front sprocket, or chainring 136. A rear gear change device 138, such as a derailleur, is disposed at the rear wheel 106 to move the chain 126 between different sprockets of the sprocket assembly 128. Additionally or alternatively, the bicycle 100 may include a plurality of front chainrings and a front gear change device to move the chain 126 between the plurality of chainrings.

The example bicycle 100 can include a suspension system having one or more suspension components. In the illustrated example, the bicycle 100 includes a rear suspension component 140. In this example, the rear suspension component 140 is implemented as or includes a shock absorber. In some examples, the front fork 108 is also implemented as a front suspension component. For example, a spring can be integrated into one of the legs and a damper can be integrated into the other leg. The front fork 108 and the rear suspension component 140 absorb shocks and vibrations while riding the bicycle 100 (e.g., when riding over rough terrain). In other examples, the front fork 108 and/or the rear suspension component 140 may be integrated into the bicycle 100 in other configurations or arrangements.

In some examples, one or more of the components of the bicycle 100 may include electronic components for controlling and/or monitoring various aspects of the bicycle 100. For example, the bicycle 100 of FIG. 1 includes a control device or bicycle computer 142 that is mounted on the handlebars 118. The bicycle computer 142 may wirelessly communicate with the seat post 112, the rear gear change device 138, the front fork 108, and/or the rear suspension component 140 to collect data and/or control operation of the respective components. The bicycle computer 142 may also wirelessly communicate with a power meter 144 of the crank assembly 124. The foregoing components may be paired to a wireless network.

While the example bicycle 100 depicted in FIG. 1 is a type of mountain bicycle, the example height adjustable seat posts disclosed herein can be implemented on other types of bicycles. For example, the example seat posts disclosed herein may be used on road bicycles, as well as bicycles with mechanical (e.g., cable, hydraulic, pneumatic, etc.) and non-mechanical (e.g., wired, wireless) drive systems. The example seat posts disclosed herein may also be implemented on other types of two-wheeled, three-wheeled, and four-wheeled human powered vehicles. Further, the example seat posts disclosed herein can be used on other types of vehicles, such as motorized vehicles (e.g., a motorcycle).

FIG. 2 is a perspective view of the example height adjustable seat post 112 that can be implemented on the bicycle 100 of FIG. 1. The seat post 112 can also be referred to as a dropper seat post or seat post assembly. The length or height of the example seat post 112 is adjustable so that the height of the seat 110 (FIG. 1) can be raised or lowered. In the illustrated example, the seat post 112 includes a first tube 202, referred to herein as a lower tube 202, and a second tube 204, referred to herein as an upper tube 204. The lower and upper tubes 202, 204 may also be referred to as seat post portions or segments. As shown in FIG. 2, the lower and upper tubes 202, 204 are configured in a coaxial arrangement and aligned along an axis 206. The axis 206 corresponds to a central or longitudinal axis of the seat post 112. The lower tube 202 has a first end 208, referred to herein as an upper end 208, and a second end 210, referred to herein as a lower end 210, opposite the upper end 208. The upper tube 204 similarly has a first end 212, referred to herein as an upper end 212, and a second end 500 (shown in FIGS. 5 and 6), referred to herein as a lower end 500, opposite the upper end 212. The upper tube 204 and the lower tube 202 are configured in a telescopic arrangement. In particular, in this example, the upper tube 204 extends into an opening 213 in the upper end 208 of the lower tube 202. As such, the upper tube 204 is at least partially disposed in the lower tube 202. The upper tube 204 is slidable into and out of the opening 213 in the lower tube 202, which enables the overall height or length of the seat post 112 to change. In other examples, the lower and upper tubes 202, 204 can be configured such that the lower tube 202 extends into the lower end 500 of the upper tube 204.

In the illustrated example, the seat post 112 includes a seat clamp 214 that is coupled (e.g., welded, bolted, threaded, etc.) to the upper end 212 of the upper tube 204. The seat clamp 214 is used to couple the seat 110 (FIG. 1) to the seat post 112. In this example, the seat clamp 214 includes two threaded fasteners 216, 218 (e.g., bolts) that can be tightened to secure the seat 110 to the upper tube 204. In other examples, the seat post 112 can include other mechanisms for attaching to the seat 110. In the illustrated example, the seat post 112 includes a lower cap assembly 220 coupled to the lower end 210 of the lower tube 202.

When the seat post 112 is installed on the bicycle 100 (FIG. 1), the lower tube 202 is coupled to the frame 102 (FIG. 1). For example, the lower tube 202 can be inserted into the seat tube 114 (FIG. 1) and secured by the clamp 116 (FIG. 1). The upper tube 204 extends upward from the lower tube 202 and supports the seat 110 (FIG. 1). As disclosed in further detail herein, the seat post 112 has an internal piston and valve that enables the upper tube 204 to move (e.g., slide) downward relative to the lower tube 202 and provides rebounding force to move the upper tube 204 upward relative to the lower tube 202. This enables a rider to easily lower the height of the seat 110 or raise the height of the seat 110. The seat post 112 is adjustable between a fully extended position (also referred to as a top-out position), shown in FIG. 2, and a fully contracted position (also referred to as a bottom-out position) in which the upper tube 204 is moved into the lower tube 202 until a stop or limit is reached. The seat post 112 can also be expanded/contracted to any position between the fully extended position and the fully contracted position and maintained in place. For example, FIG. 3 shows an example in which the upper tube 204 has been partially moved into the lower tube 202. As such, the seat 110 (FIG. 1) would be lowered or closer to the ground compared to the position in FIG. 2. Therefore, the upper tube 204 and the lower tube 202 can be moved between at least a first position and a second position, where the first position may correspond to the fully extended position and the second position may correspond to the fully contracted position, or any positions therebetween.

In the illustrated example of FIG. 2, the seat post 112 includes a control module 222, which may also be referred to as a controller or control unit. The control module 222 includes a power supply (e.g., a battery) and circuitry (e.g., processor circuitry, logic circuitry, etc.) to operate the internal valve of the seat post 112. In this example, the control module 222 is coupled to an outer surface 224 of the lower tube 202 at or near the upper end 208 of the lower tube 202. Some known dropper posts locate the control module on the seat clamp. However, this location can interfere with the rear tire clearance. Therefore, locating the control module 222 at the upper end 208 of the lower tube 202, adjacent the overlap region, can be advantageous to improve rear wheel clearance. This location also helps maintain a minimal ratio of drop height to overall length.

As an example operation, if a rider desires to lower the seat 110 (FIG. 1), the rider actuates a seat post actuator such as, in this example, the seat post actuation button 113 (FIG. 1). In FIG. 1 the seat post actuation button 113 is mounted on the handlebars 118 such that the rider can actuate the seat post actuation button 113 with one of their fingers (e.g., their thumb). Alternatively, the seat post actuation button 113 may be a lever or other type of user interface such a display device with a touch screen. When the seat post actuation button 113 is pressed, the seat post actuation button 113 transmits a signal (e.g., a wireless signal) to the control module 222. The control module 222 receives the signal from the seat post actuation button 113 and activates an actuator or motor to open the internal valve in a pneumatic chamber in the upper tube 204, as disclosed in further detail herein. While the internal valve is open, the rider can push downward on the seat 110, which slides the upper tube 204 into the lower tube 202 (e.g., as shown in the position of FIG. 3), thereby lowering or reducing the height of the seat 110. In some examples, the rider can apply this force by sitting on the seat 110 and applying the downward force with their bottom. When the seat 110 reaches the desired height, the rider can release the seat post actuation button 113. In response, the control module 222 closes the internal valve, which maintains the upper tube 204 in place relative to the lower tube 202. When the rider desires to raise the seat 110, the rider can press the seat post actuation button 113 again. The control module 222 receives the signal and opens the internal valve. When little or no downward force is acting on the seat 110 (e.g., the rider is standing on the pedals and not resting their bottom on the seat 110), the internal pneumatic system pushes the upper tube 204 upward from the lower tube 202, thereby moving the seat 110 upward. The upper tube 202 moves upward until the fully extended position is reached. Otherwise, when the desired position is reached, the rider can release the seat post actuation button 113. When the seat post actuation button 113 is released, the internal valve closes and holds the seat post 112 in the current position. Therefore, the seat post height can be easily adjusted by the rider.

In some examples, to activate the internal valve, the rider pushes and holds the seat post actuation button 113. As long as the seat post actuation button 113 is depressed, the valve is held in the open state, which enables the upper tube 204 to slide upward or downward relative to the lower tube 202. When the rider releases the seat post actuation button 113, the interval valve is closed, which maintains the upper tube 204 in place. However, in other examples, the system can be configured such that the rider may press and release the seat post actuation button 113 to cause the valve to open, and then the rider presses the seat post actuation button 113 a second time to close the valve.

Figure 4:
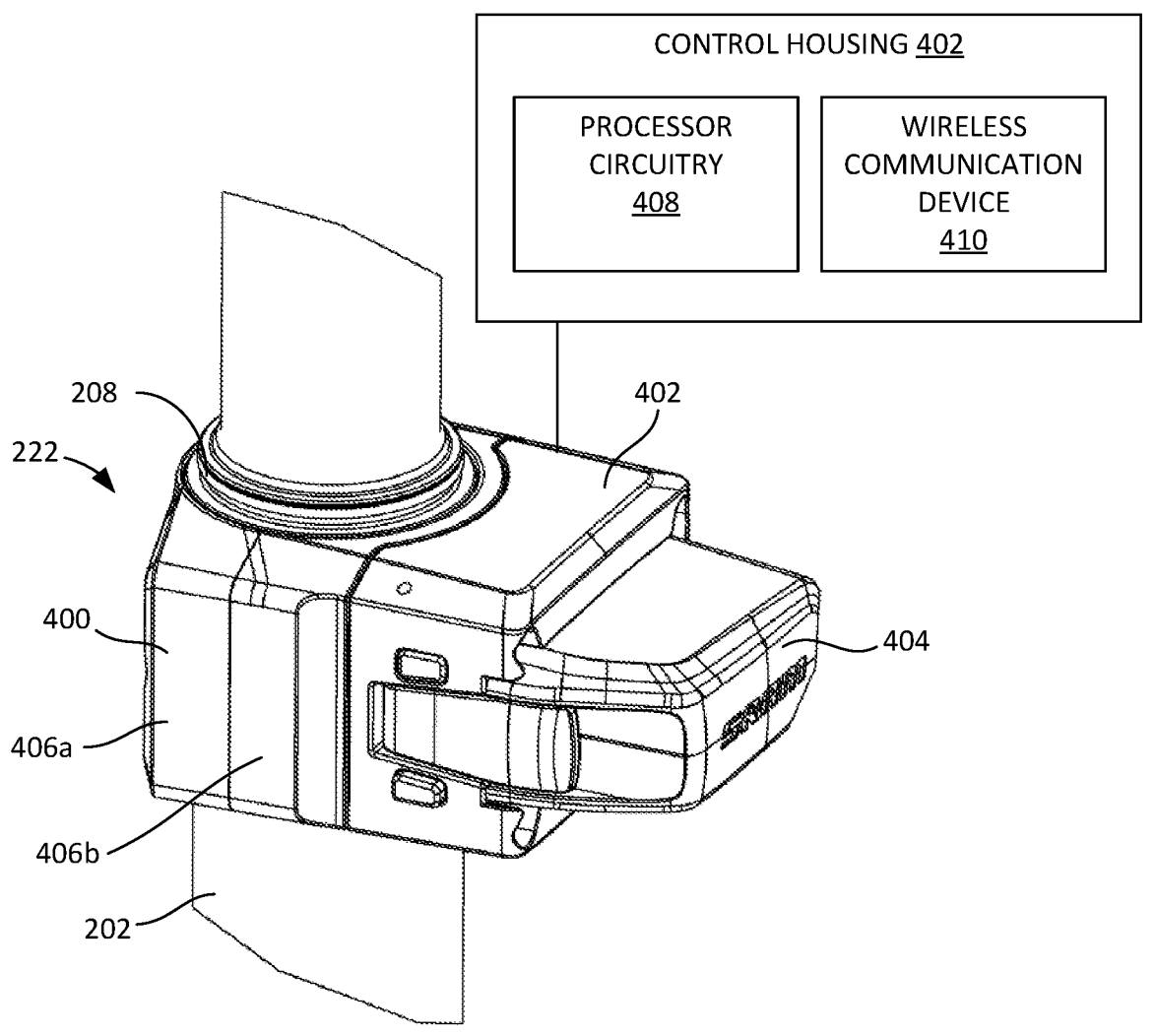
FIG. 4 is an enlarged view of an example control module that can be implemented on the example height adjustable seat post of FIG. 2.

FIG. 4 is an enlarged view of the control module 222 on the lower tube 202. In the illustrated example, the control module 222 includes a collar 400, a control housing 402 coupled to the collar 400, and a power supply, in this example a battery 404, coupled to the control housing 402. The collar 400 is wrapped around the lower tube 202 and is used to couple the control module 222 to the lower tube 202. In this example, the collar 400 includes a first portion 406a and a second portion 406b that are coupled together and therefore clamped around the lower tube 202. In some examples the first and second portions 402a, 402b are coupled by a snap-fit and/or threaded fasteners (e.g., screws, bolts, etc.). The control housing 402 contains electronic components for receiving control signals and operating the internal valve (e.g., opening the valve, closing the valve, etc.). For example, FIG. 4 shows a block diagram of the control housing 402. The control housing 402 includes processor circuitry 408 and a wireless communication device 410. The wireless communication device 410 includes a receiver. The wireless communication device 410 can receive wireless control/command signals from the seat post actuation button 113 and/or another bicycle component such as the bicycle computer 142. Additionally, in some examples, the wireless communication device 410 can include a transmitter (e.g., a transceiver) and may send wireless control/command signals to the seat post actuation button 113 and/or other bicycle components such as the bicycle computer 142. In response to receiving a command, for example, the processor circuitry 408 activates a motor (e.g., by applying a current or voltage to the motor) to open the internal valve to enable the seat post 112 to expand or contract. When the seat post actuation button 113 is released, no control/command signals are received and the processor circuitry 408 activates the motor to close the valve, thereby maintaining the seat post 112 in its current position. In other examples, a second or separate control/command signal is received when the seat post actuation button 113 is released. The wireless communication device 410 is configured to communicate wirelessly, and as such includes one or more antennae. The wireless communication device 410 provides for wireless communication in any known or later developed format. Although the present specification describes components and functions that may be implemented in particular embodiments with reference to particular standards and protocols, the examples disclosed herein are not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Bluetooth®, ANT+™, ZigBee, WiFi and/or AIREA™ standards may also, or alternatively, be used. Accordingly, replacement standards and protocols having the same or similar functions as those disclosed herein are considered equivalents thereof.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

The battery 404 supplies power to the electronic components of the control housing 402, which controls the motor for operating the valve. The battery 404 also supplies power to energize or activate the motor. In some examples, the battery 404 is removeable, such as by pressing a release tab or button or sliding the battery 404 in a certain direction away from the control housing 402 (FIG. 4). In some examples, the battery 404 can be removed, charged, and reattached to the control housing 402. In other examples, the battery 404 may be fixed to the seat post 112 in a manner that requires disassembly to remove (e.g., removing one or more screws). In some examples, the battery 404 can be charged while the battery 404 is attached to the control housing 402. The battery 404 may be charged by wire or wirelessly. For example, the battery 404 can have a charging port or charging surface for charging. In other examples, the battery 404 may not be rechargeable and must be replaced with a new battery. In this example, the power supply for powering the motor is attached to the collar 400 at the upper end 208 of the lower tube 202. In some examples, the battery 404 is fixed relative to the lower tube 202 (via the collar 400), and fixed relative to the lower tube 202 when installed on the bicycle 100 (FIG. 1). In other examples, the battery 404 can be located in various locations, such as the clamp 116 (FIG. 1), the collar 400 (FIG. 4), or the lower end 210 of the lower tube 202. The battery 404 may also be mounted remote from the seat post 112 and connected to the seat post 112 by electrical wires (e.g., one or more wires extending through or along the frame 102).

Figures 8, 9:
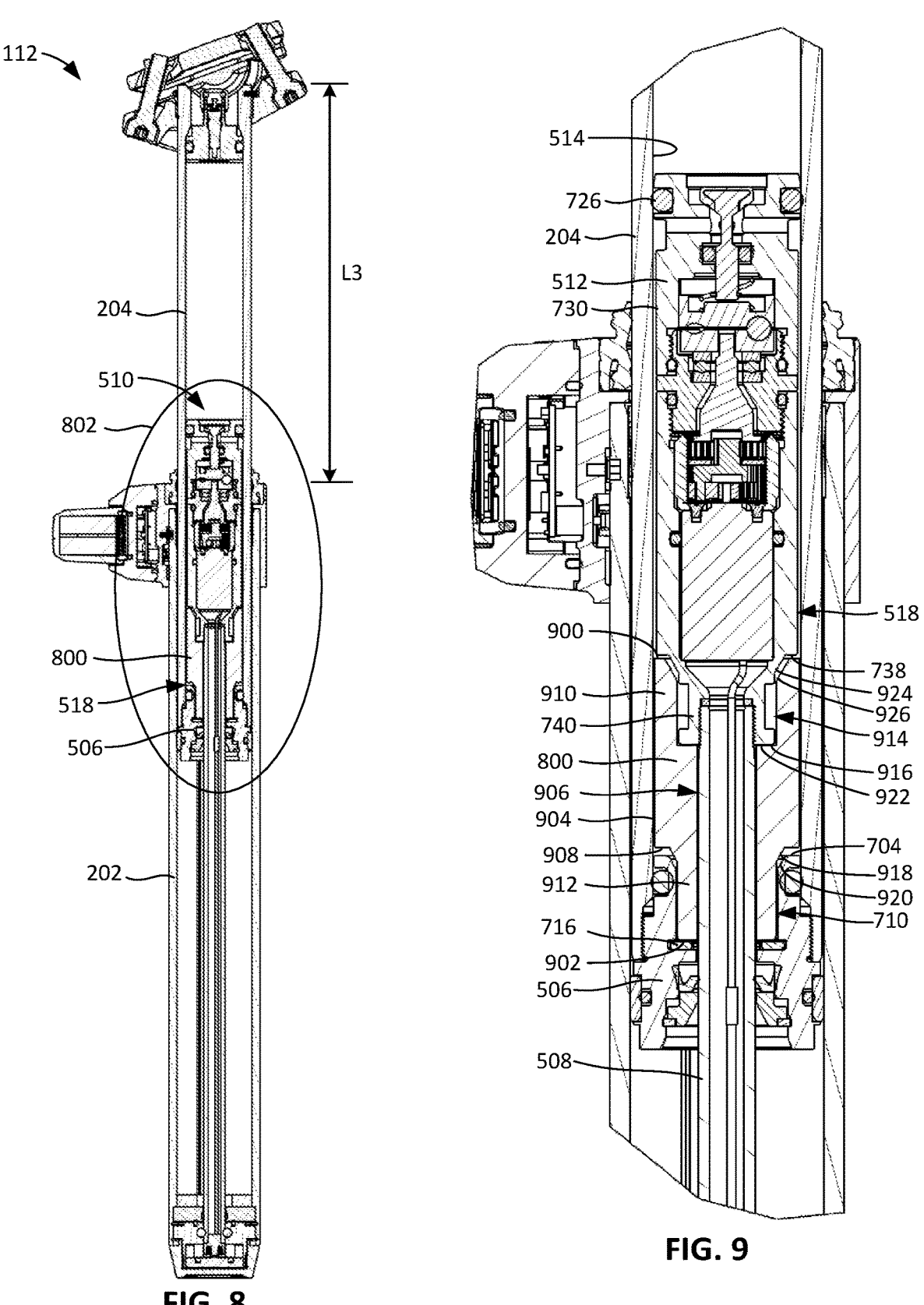
FIG. 8 is a cross-sectional view of the example height adjustable seat post of FIG. 2 in the fully extended position and including an example spacer in an example negative chamber in the example height adjustable seat post.
FIG. 9 is an enlarged view of the example callout of FIG. 8.

FIG. 5 is a cross-sectional view of the seat post 112 in the fully extended position corresponding to FIG. 2, and FIG. 6 is a cross-sectional view of the seat post 112 in a partially contracted position corresponding to FIG. 3. FIGS. 5 and 6 show an example of the seat post 112 without a spacer. FIGS. 8 and 9 show an example of the seat post 112 with an example spacer, which is disclosed in further detail herein.

As shown in FIGS. 5 and 6, the upper tube 204 has a lower end 500. The lower end 500 is disposed in the lower tube 202. As such, the lower and upper tubes 202, 204 overlap at an area or region of overlap. In FIG. 5, the amount of the upper tube 204 extending outward (e.g., upward) from the lower tube 202 is defined by a first length of L1, and in FIG. 6, the amount of the upper tube 204 extending outward from the lower tube 202 is defined by a second length L2, which is less than L1. As such, the overall height or length of the seat post 112 in FIG. 6 is less than the height or length of the seat post 112 in FIG. 5.

As shown in FIGS. 5 and 6, the upper tube 204 defines a chamber 502. The chamber 502 is filled with fluid (e.g., pneumatic gas), as discussed in further detail herein. The seat post 112 includes an upper sealhead 504 (e.g., a plug or bushing) coupled to the upper tube 204 at or near the upper end 212. In this example, the upper sealhead 504 is inside the upper tube 204, but in other examples can be outside the upper tube 204. The seat post 112 also includes a lower sealhead 506 coupled to the upper tube 204 at or near the lower end 500. In this example, the lower sealhead 506 is inside the upper tube 204, but in other examples can be outside of the upper tube 204. The upper and lower sealheads 504, 506 seal the ends of the upper tube 204 to maintain the fluid in the chamber 502.

In the illustrated example of FIGS. 5 and 6, the seat post 112 includes a shaft 508, which may be referred to as a rod. The shaft 508 is disposed in the lower tube 202 and coupled to the lower tube 202 (e.g., near the lower end 210), such that the shaft 508 is fixed relative to the lower tube 202. For example, the lower cap assembly 220 includes a mount 509 disposed in and coupled to the lower tube 202 at the lower end 210. A bottom end of the shaft 508 is coupled to the mount 509. The shaft 508 extends upward through the lower tube 202 and through the lower sealhead 506 and into the upper tube 204. In particular, the shaft 508 extends through the lower sealhead 506 and into the chamber 502 defined in the upper tube 204. The lower sealhead 506 is slidable up and down along the shaft 508 as the seat post 112 expands or contracts.

In the illustrated example of FIGS. 5 and 6, the seat post 112 includes a piston assembly 510 disposed in the upper tube 204. The piston assembly 510 may also be referred to as a valve assembly or flow control assembly. The piston assembly 510 is disposed in the chamber 502 of the upper tube 204 and is coupled to the shaft 508. As the seat post 112 expands or contracts, the piston assembly 510 moves closer to or further away from the upper and lower ends 212, 500 of the upper tube 204. The piston assembly 510 includes a piston 512 that is sealed against an inner surface 514 of the upper tube 204. The inner surface 514 of the upper tube 204 is slidable up and down along the piston 512 as the seat post 112 expands or contracts. The piston assembly 510 and, in particular, the piston 512, divides the chamber 502 of the upper tube 204 into a first chamber 516 (between the piston 512 and the upper sealhead 504) and a second chamber 518 (between the piston 512 and the lower sealhead 506). The first and second chambers 516, 518 may also be referred to as upper and lower chambers, respectively, or positive and negative chambers 516, 518, respectively. The first chamber 516 is bound by the piston assembly 510, the upper sealhead 504, and the upper tube 204. The second chamber 518 is bound by the piston assembly 510, the lower sealhead 506, the upper tube 204, and the shaft 508. The volumes of the first and second chambers 516, 518 change as the upper tube 204 moves up and down relative to the piston assembly 510. The first and second chambers 516, 518 are filled with a fluid. In this example, the seat post 112 is based on a pneumatic platform. Therefore, the first and second chambers 516, 518 can be filled with a pressurized gas, such as air or nitrogen. In other examples the first and second chambers 516, 518 can be filled with another type of compressible gas. The piston assembly 510 controls the flow of fluid (e.g., pressurized gas) across the piston 512 and between the first and second chambers 516, 518.

In the illustrated example of FIGS. 5 and 6, the seat post 112 includes a valve 520 and a motor 522 to control the state of the valve 520. In this example, the valve 520 and the motor 522 are part of the piston assembly 510 and incorporated into and/or integrated with the piston 512. As such, the valve 520 and the motor 522 disposed in the upper tube 204 and at least partially in a region of overlap (e.g., L1 or L2) between the upper tube 204 and the lower tube 202. In this example, the valve 520 is a poppet valve, which includes a poppet that is moveable in a linear direction to open or close the valve 520. However, in other examples, other types of valves can be used. The valve 520 can be operated (e.g., opened or closed) to control the flow of gas across the piston 512 between the first and second chambers 516, 518. In particular, the valve 520 is operable between a closed state in which the fluid (e.g., pressurized gas) is blocked from flowing across the piston 512 between the first and second chambers 516, 518, which maintains the lower and upper tubes 202, 204 in their current position, and an open state to enable the fluid to flow across the piston 512 between the first and second chambers 516, 518, which enables the upper tube 204 to move relative to the lower tube 202 for adjusting the height of the seat 110 (FIG. 1). While in this example the valve 520 is operated by the motor 522, in other examples the seat post 112 can include a solenoid or other type of actuator to control the valve 520. Further, while in this example the motor 522 is integrated into the piston assembly 510 in the upper tube 204, in other examples, the motor 522 can be disposed in another location. For example, the motor 522 can be coupled to the lower end 210 of the lower tube 202.

In some examples, the upper sealhead 504 includes and/or is otherwise implemented as a valve 523, which enables a user to add or remove pneumatic fluid to/from the chamber 502 in the upper tube 204. In this example, the valve 523 is implemented as a Schrader valve. However, in other examples, the valve 523 may be implemented as another type of valve, such as a Presta valve. A user can remove the seat clamp 214 and access the valve 523 to add or remove pneumatic fluid to/from the chamber 502. In some examples, the valve 523 can be on a side of the upper tube 204 near the upper end 212.

In the illustrated example of FIGS. 5 and 6, the first chamber 516 is a positive pressure chamber and the second chamber 518 is a negative pressure chamber. The first chamber 516 and the second chamber 518 are pressure sealed chambers. The lower tube 202 defines a third chamber 526 between the lower sealhead 506 and the lower cap assembly 220. The third chamber 526 is considered a pressure control chamber. The volume of the third chamber 526 changes based on the actuated position. In some examples, the third chamber 526 is vented to the atmosphere and therefore contains air at atmospheric pressure. However, in other examples, the third chamber 526 is also a pressure sealed chamber (e.g., containing pressurized air or nitrogen). In such an example, the fluid (e.g., air) in the third chamber 526 may be compressed as the upper tube 204 is moved downward. This compressed fluid can provide a biasing force to return the seat post 112 to the fully extended position. In other examples, the third chamber 526 can have other mechanisms for compensating for the change in volume, such as a floating piston or a deformable bladder. The first chamber 516, the second chamber 518, and the third chamber 526 may be any number of shapes and/or sizes. For example, the first chamber 516, the second chamber 518, and the third chamber 526 may be cylindrically shaped (e.g., with outer diameters between 27 millimeters (mm) and 35 mm, respectively) and may be sized for a particular maximum post adjustment (e.g., 150 mm).

As shown in FIGS. 5 and 6, the piston 512 has a first side 528 (e.g., a top side) facing the upper sealhead 504 and a second side 530 (e.g., a bottom side) opposite the first side 528 and facing the lower sealhead 506. An axial surface area (as viewed along the axis 206) of the first side 528 of the piston 512 is greater than an axial surface area of the second side 530 of the piston 512. This is because a portion of the axial surface area of the second side 530 is reduced by the cross-sectional area of the shaft 508. When the valve 520 is in the closed state and the seat post 112 is in the fully extended position (FIG. 5), the first chamber 516 acts as a spring and is configured to bias the upper tube 204 towards the fully extended position of the seat post 112. The first side 528 and the second side 530 of the piston 512 are sized and shaped, and the first chamber 516 and the second chamber 518 are respectively pressurized when the seat post 112 is in the fully extended position, such that the gas within the first chamber 516 supports the weight of the rider. In some examples, the seat 110 (FIG. 1) sags less than 10 mm as a result of the weight of the rider on the seat 110 when the seat post 112 is in the fully extended position. The seat post 112 operates because the axial surface area of the first side 528 of the piston 512 versus a pneumatic pressure ratio between the first chamber 516 and the second chamber 518 holds up the rider based on the force calculation. This is also dependent on the volume of the second chamber 518 at the fully extended position of the seat post 112. In the illustrated example of FIG. 5, the volume of the first chamber 516 is greater than the volume of the second chamber 518 when the seat post 112 is in the fully extended position. In some examples, the volume of the second chamber 518 may be no more than twenty percent of the volume of the first chamber 516 when the seat post 112 is in the fully extended position. In other examples, the first and second chambers 516, 518 may have a different volume ratio in the fully extended position. For example, the volume of the second chamber 518 may be no more than ten percent, five percent, or three percent of the volume of the first chamber 516 when the seat post 112 is in the fully extended position. This makes the seat post 112 act like a zero negative pressure preloaded pneumatic spring. This is the principal that holds up the rider with a feel the rider experiences as being rigid. At the fully extended position of the seat post 112, the seat 110 may move a small amount, but this movement is typically not perceivable to the rider.

As an example operation, assume the seat post 112 is in the fully extended position shown in FIG. 5 and the rider desires to lower the seat 110 (FIG. 1). The rider presses a seat post actuation button 113 (FIG. 1) on the handlebars 118 (FIG. 1), and the control module 222 activates the motor 522 to open the valve 520. When the valve 520 is open, a force can be applied downward on the seat 110 to compress the seat post 112. For example, the rider can sit (or partially sit) on the seat 110 to apply downward pressure with his/her bottom. This downward pressure forces fluid (e.g., pressurized gas) from the first chamber 516 to flow through the valve 520 and across the piston 512 and into the second chamber 518. This enables the upper tube 204 to move downward and into the lower tube 202, thereby lowering the seat 110. As the upper tube 204 is moved downward, the volume of the first chamber 516 is reduced and the volume of the second chamber 518 is increased. The rider can move (e.g., lower) the seat 110 to any position between the fully extended position and a fully contracted position. FIG. 6 shows the seat post 112 as in an intermediate position between the fully extended position and the fully contracted position.

When the seat 110 is at a desired position, such as the position in FIG. 6, the rider can release the seat post actuation button 113 (FIG. 1). The control module 222 activates the motor 522 to close the valve 520. When the valve 520 is closed, the fluid (e.g., pressurized gas) is prevented from flowing across the piston assembly 510 between the first chamber 516 and the second chamber 518. This limits or prevents further relative movement of the upper tube 204 relative to the lower tube 202. When the valve 520 is closed, the balance of forces in the system is such that the axial pressure force acting on the first side 528 of the piston 512 is approximately equal to the axial pressure force acting on the second side 530 of the piston 512. Using a compressible fluid such as air enables the pressure chamber to act as a compression spring when a downward force is applied on the upper tube 204. Therefore, when the rider sits on the seat 110, the seat post 112 can support the weight of the rider. In some examples, when the seat post 112 is in an intermediate position (between the fully extended position and the fully contracted position), the seat 110 may sag a small amount (e.g., 40 mm or less) as a result of the weight of the rider. The seat post 112 can be maintained at any position between the fully extended position and the fully contracted position. If the seat post 112 is moved to the fully contracted position, the seat clamp 214 contacts the upper end 208 of the lower tube 202 and/or the lower sealhead 506 contacts the lower cap assembly 220. This provides a hard stop to prevent further movement. When the seat post 112 is in the fully contracted position, the seat 110 may not sag due to this hard stop.

When it is desired to raise the seat post 112 back to the fully extended position, the rider presses on the seat post actuation button 113 (FIG. 1), and the control module 222 activates the motor 522 to open the valve 520. With no external downward force acting on the seat 110 (FIG. 1), the pressure in the first chamber 516 the upper tube 204 causes the upper tube 204 to move upward relative to the lower tube 202 back to the fully extended position. This is because the axial surface area of the first side 528 of the piston 512 is greater than the axial surface area on the second side 530 of the piston 512. As such, the force of the pressure in the first chamber 516 acting on the first side 528 of the piston 512 is larger than the force from the pressure in the second chamber 518 acting on the second side 530 of the piston 512. As a result, the upper tube 204 is forced upward to the fully extended position. As the upper tube 204 moves upward, fluid flows across the valve 520 from the second chamber 518 to the first chamber 516. Therefore, the axial pressure force imbalance biases the seat post 112 towards the fully extended position. This enables the seat post 112 to automatically expand back to the fully extended position shown in FIG. 5. In particular, the upper tube 204 moves upward relative to the lower tube 202 until the top of the lower sealhead 506 engages the second side 530 of the piston 512. This forms a limit or stop that defines the fully extended (top-out) position. When the seat post 112 in the fully extended position, the rider can release the seat post actuation button 113, which activates the motor 522 to close the valve and thereby maintain the seat post 112 in the fully extended position. Therefore, the pressurized gas in the first chamber 516 biases the upper and lower tubes 204, 202 away from each other, and the pressurized gas in the second chamber 518 biases the upper and lower tubes 204, 202 toward each other.

As disclosed above, in some examples, the third chamber 526 is vented to the atmosphere. As such, the third chamber 526 provides minimal, if any, biasing force on the upper tube 204. However, in other examples, the third chamber 526 can be sealed and pressurized with a positive pressure. In such an example, when the upper tube 204 is moved downward, the volume of the third chamber 526 is reduced, which increases the pressure in the third chamber 526. This pressure acts upward on the lower sealhead 506 to help bias the upper tube 204 to the fully extended position.

As disclosed above, the control module 222 includes the processor circuitry 408 (FIG. 4), which is configured to control and operate the motor 522 to open and close the valve 520. In the illustrated example of FIGS. 5 and 6, the control module 222 is located on the outer surface 223 of the lower tube 202, at or near the upper end 208 of the lower tube 202, while the motor 522 is located in the piston assembly 510 in the chamber 502 of the upper tube 204. The seat post 112 can include one or more wires and/or electrical connections to form an electrical path between the control module 222 and the motor 522. This enables power and/or command signals to be transferred between the control module 222 and the motor 522. For example, as shown in FIGS. 5 and 6, the seat post 112 includes first and second wires 532, 534 disposed in the lower tube 202. In some examples, the first and second outer tube 532, 534 wires are positive and negative wires. The first and second outer tube wires 532, 534 are electrically coupled to the control module 222. The first and second outer tube wires 532, 534 extend through the lower tube 202 to the lower cap assembly 220. In other words, in this example, the first and second outer tube wires 532, 534 extend between the upper end 208 and the lower end 210 of the lower tube 202. In some examples, the first and second outer tube wires 532, 534 are disposed along an inner surface 536 of the lower tube 202 (e.g., in one or more channels disposed along the inner surface 536).

In the illustrated example, the seat post 112 also includes first and second inner tube wires 538, 540. The first and second inner tube wires 538, 540 are disposed in the shaft 508 and extend between the lower cap assembly 220 and the motor 522. The lower cap assembly 220 includes one or more electrical connectors or wire bridging to electrically couple the outer tube wires 532, 534 and the respective inner tube wires 538, 540. The outer and inner tube wires 532, 534, 538, 540 can be soldered or crimped to the electrical connectors in the lower cap assembly 220. Therefore, the outer tube wires 532, 534, the inner tube wires 538, 540, and the electrical connectors form an electrical path between the control module 222 and the motor 522. As such, positive and negative electrical connections are formed between the control module 222 and the motor 522. The control module 222 can activate the motor 522 by applying power through the electrical connections. While in this example the state of the seat post 200 is changed electronically by the control module 222, in other examples, the seat post 200 can be configured to be changed states by a hydraulic line or a mechanical cable or linkage.

Figure 7:
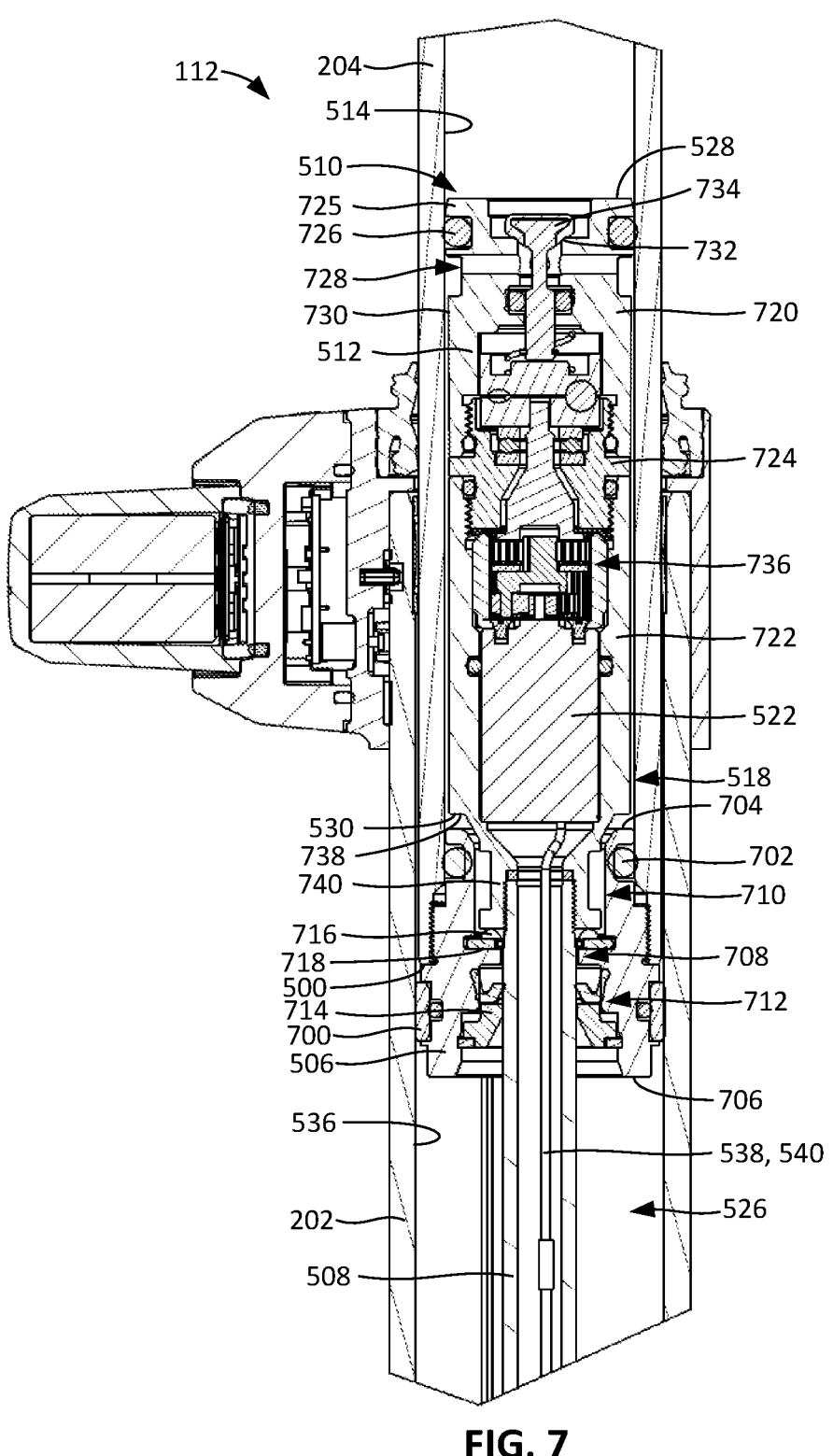
FIG. 7 is an enlarged view of the callout of FIG. 5 showing an example piston assembly.

FIG. 7 is an enlarged view of the callout 542 of FIG. 5. As shown in FIG. 7, the lower sealhead 506 is threadably coupled to the lower end 500 of the upper tube 204, which seals the lower end 500 of the upper tube 204. The seat post 112 includes a lower bushing 700 in a groove in the lower sealhead 506, which is slidably engaged with the inner surface 536 of the lower tube 202. As the upper tube 204 telescopes relative to the lower tube 202, the upper tube 204 is radially supported by the lower bushing 700. A static seal 702 (e.g., an o-ring) is disposed in a groove in the lower sealhead 506, which forms a seal between the lower sealhead 506 and the inner surface 514 of the upper tube 204.

The lower sealhead 506 has a first end 704, a second end 706 opposite the first end 704, and a channel 708 extending through the lower sealhead 506 between the first end 704 and the second end 706. The first end 704 faces and/or is exposed to fluid in the second chamber 518, and the second end 706 faces and/or is exposed to fluid in the third chamber 526. The shaft 508 extends through the channel 708. The lower sealhead 506 has a first bore 710 extending into the first end 704 and a second bore 712 extending into the second end 706, which form a portion of the channel 708. In the illustrated example, the seat post 112 includes a shaft seal 714 disposed in the second bore 712. The shaft seal 714 forms a pressure tight seal between the lower sealhead 506 and the shaft 508 to prevent fluid leakage through the lower sealhead 506. The shaft seal 714 also enables the lower sealhead 506 to slide smoothly up and down along the shaft 508 as the seat post 112 expands and contracts.

In the illustrated example, the seat post 112 includes a bumper 716 (which may be referred to as a top-out bumper) coupled to the lower sealhead 506. When the seat post 112 is in the fully extended position, as shown in FIG. 7, the second side 530 of the piston 512 is engaged with or contacting the bumper 716. The bumper 716 reduces shock loads when the seat post 112 from a top-out actuation. In some examples, the bumper 716 is constructed of a compliant or elastic material, such as rubber. For example, the bumper 716 may be constructed of a softer rubber or a harder rubber in the range of 40 A to 90 A on the Shore A scale, but in other examples could be harder or softer. As another example, the bumper 716 may be constructed of a viscoelastic material, such as urethane or buna-nitrile. In the illustrated example, the bump 716 is disposed in the first bore 710 and along a shoulder 718 of the first bore 710. In the illustrated example, the bumper 716 is disposed in a gland or groove to retain in the bumper 716 in position. Additionally or alternatively, the bumper 716 can be coupled to the lower sealhead 506 via other techniques (e.g., a threaded fastener, an adhesive, friction fit).

The piston assembly 510 includes the piston 512. The piston 512 may also be referred to as a valve body. In the illustrated example, the piston 512 includes an upper body portion 720, a middle body portion 722, and a lower body portion 724 that are coupled together. For example, in FIG. 7, the upper and lower body portions 720, 724 are threadably coupled to the middle body portion 722. However, in other examples, the piston 512 can be constructed of more or fewer body portions (e.g., one body portion). In the illustrated example, the lower body portion 724 is threadeably coupled to the shaft 508. In other examples the piston 512 may be coupled to the shaft 508 via other attachment techniques (e.g., welding, fasteners, etc.). In some examples, the piston 512 is constructed of metal and/or a plastic polymer.

The piston 512 has a head portion 725 that is sealed against the inner surface 514 of the upper tube 204. In particular, in this example, the piston assembly 510 includes a seal 726 (e.g., an o-ring), which may be referred to as a chamber seal or piston seal, around the head portion 725 to seal against the inner surface 514 of the upper tube 204. As such, the piston 512 with the seal 726 divides the chamber 502 of the upper tube 204 into the first chamber 516 (formed above the head portion 724) and the second chamber 518 (formed below the head portion 724).

In the illustrated example, the piston 512 defines a fluid passageway 728 extending between the first side 528 of the piston 512 and a side surface 730 of the piston 512. As such, the fluid passageway 728 fluidly connects the first chamber 516 and the second chamber 518. A portion of the fluid passageway 728 forms a sealing surface or seat 732. In the illustrated example, the piston assembly 510 includes a flow control member 734 (e.g., a poppet, a plug). The flow control member 734 is slidably disposed in the fluid passageway 728. In this example, the flow control member 734 is moveable in a linear direction between a closed position and an open position. In the closed position, which is shown in FIG. 7, the flow control member 734 is engaged with the seat 732 and blocks fluid flow through the fluid passageway 728. As such, fluid is prevented from flowing across the piston 512 between the first and second chambers 516, 518. In the open position, the flow control member 734 is spaced from the seat 732 and therefore allows fluid flow through the fluid passageway 728 and across the piston 512 between the first and second chambers 516, 518. The fluid passageway 728 and the flow control member 734 form the valve 520. As such, the valve 520 is disposed in and/or formed at least partially by the piston 512. The valve 520 is operable between the closed state to block fluid flow across the piston 512 and the open state to allow fluid flow across the piston 512.

In the illustrated example, the motor 522 is disposed in the lower body portion 722 of the piston 512. As shown in FIG. 7, the inner wires 538, 540 extend through the shaft 508 and into the lower body portion 722 of the piston 512 and the electrically connected to the motor 522. The motor 522, when activated, moves the flow control member 734 between the closed and open position. In the illustrated example, the piston assembly 510 includes a gear system 736 in the piston 512, operably coupled between the motor 522 and the flow control member 734. The gear system 736 transfers power and/or movement from the motor 522 to the flow control member 734. In some examples, the gear system 736 includes one or more gear arrangements (e.g., a planetary gear system) to provide speed reduction between the output shaft and the flow control member 734. In some examples, the motor 522 has a rotatable output shaft, while the flow control member 734 is moveable in a linear direction. Therefore, the gear system 736 is used to convert rotational motion of the output shaft to linear movement of the flow control member 734. In other examples, the valve 520 can be configured as a rotary valve. In such an example, the flow control member 734 would rotate between the closed position and the open position. In other examples, the motor 522 can be implemented as a linear-type motor or solenoid that has a linear moving output shaft.

As shown in FIG. 7, the second side 530 of the piston 512 has a shoulder 738 and an extension 740 extending downward from the shoulder 738. When the seat post 112 is in the fully extended position, the extension 740 extends into the first bore 710 of the lower sealhead 506 and is engaged with the bumper 716. In this position, the shoulder 738 is spaced from the first end 704 of the lower sealhead 506. As such, in this position, the second chamber 518 is formed by the space below the seal 726 and between the outer side surface 730 of the piston 512 and the inner surface 514 of the upper tube 204, and the space below the shoulder 738 and between the extension 740 and the inner surface of the bore 710. It is desired for the second chamber 518 to be relatively small while in the fully extended position to reduce its compressibility or squishiness. This gives the rider a firm fixed saddle height for better (e.g., maximum) pedaling efficiency.

In some instances, the seat post 112 may be too tall for certain riders when in the fully extended position. For instance, the maximum dropper post insertion into a bicycle frame is limited by the seat post collar or internal bicycle frame features. Even when a seat post is fully inserted into a bicycle frame (collar against the frame), the upper tube 204 position may still place the seat too high for some riders to properly pedal the bicycle.

FIG. 8 illustrates an example of the seat post 112 including an example spacer 800. The seat post 112 in FIG. 8 is shown in the fully extended position. The spacer 800 is used to reduce the height or length of the seat post 112 at the fully extended position. This is advantageous for shorter riders that desire a lower top-out height. In the illustrated example, the spacer 800 is disposed in the second chamber 518. In particular, the spacer 800 is disposed in the upper tube 204 between the piston assembly 510 and the lower sealhead 506. As such, when the seat post 112 is in the fully extended position, the spacer 800 separates the piston assembly 510 and the lower sealhead 506 but a certain distance. The amount of the upper tube 204 that extends outward (e.g., upward) from the lower tube 202 is a third length L3 in the fully extended position. The third length L3 of the seat post 112 in the fully extended position in FIG. 8 (with the spacer 800) is less than the first length L1 of the seat post 112 in the fully extended position in FIG. 5 (without the spacer 800). Therefore, with the spacer 800, the overall height or length of the seat post 112 is in the fully extended position is less than without the spacer 800. As such, the top-out height of the seat post 112 has been reduced or lowered.

FIG. 9 is an enlarged view of the callout 802 of FIG. 8 showing the spacer 800 in the second chamber 518 between the piston 512 and the lower sealhead 506. In the illustrated example, the spacer 800 is engaged with the bumper 716. In some examples, the spacer 800 remains in the lower part of the second chamber 518 and engaged with the bumper 716 while the seat post 112 expands and contracts. When the seat post 112 is expanded, the piston 512 engages with the spacer 800, which defines the fully extended (top-out) position. The spacer 800 consumes at least a portion of the space in the second chamber 518 and thereby prevents the piston 512 from moving further toward the lower sealhead 506.

In the illustrated example, the spacer 800 has a first end 900, a second end 902 opposite the first end 900, an outer surface 904 between the first and second ends 900, 902, and a central channel 906 extending through the spacer 800 between the first and second ends 900, 902. The shaft 508 extends through the central channel 906 of the spacer 800. The shaft 508 is slidable along the inner surface of the central channel 906 as the seat post 112 expands and contracts. In the illustrated example, the second end 902 of the spacer 800 is engaged with the bumper 716. In other examples, the bumper 716 can be omitted and the second end 902 of the spacer 800 can be engaged directly with the lower sealhead 506.

As shown in FIG. 9, the outer surface 904 of the spacer 800 has or forms a shoulder 908. The spacer 800 has a first portion 910 with a first outer diameter between the first end 900 and the shoulder 908, and a second portion 912 with a second outer diameter between the shoulder 908 and the second end 902, where the second diameter is less than the first diameter (labeled in FIG. 14). The spacer 800 has a bore 914 extending into and/or otherwise formed in the first end 900 of the spacer 800, which forms a portion of the central channel 906. The bore 914 has a bottom surface 916.

Referring briefly to FIGS. 12-15, FIG. 12 is a perspective view of the spacer 800, FIG. 13 is a top view of the first end 900 of the spacer 800, FIG. 14 is a side view of the spacer 800, and FIG. 15 is a cross-sectional view taken along line A-A of FIG. 14. As shown in FIG. 14, the first portion 910 has a first outer diameter D1, and the second portion 912 has a second outer diameter D2, which is less than the first outer diameter D1. Further, the first portion 910 has a first length of X1 and the second portion 912 has a second length of X2. In this example, the second length X2 is less than the first length X1, but in other examples can be the same as or greater than the first length XL. As shown in FIG. 15, a third length X3 is defined by the distance between the bottom surface 916 of the bore 914 and the second end 902 of the spacer 800. The third length X3 corresponds to the difference between L1 and L3. Thus, the third length X3 corresponds to the height or length of the seat post 112 in the fully extended position that is reduced by the spacer 800.

Referring back to FIG. 9, the spacer 800 is positioned in the upper tube 204 such that the first portion 910 is above the first end 704 of the lower sealhead 506 and the second portion 912 extends into the first bore 710 in the first end 704 of the lower sealhead 506. The first outer diameter D1 (FIG. 14) of the first portion 910 substantially fills the inner diameter of the upper tube 204. In some examples, the first outer diameter D1 (FIG. 14) is sized to form a transition fit (sometimes referred to as a slip fit or push fit) between the outer surface 904 of the first portion 910 of the spacer 800 and the inner surface 514 of the upper tube 204. As such, the first outer diameter D1 may be substantially the same as the inner diameter of the upper tube 204. In other example, the first outer diameter D1 (FIG. 14) may be sized to form a clearance fit between the outer surface 904 of the first portion 910 of the spacer 800 and the inner surface 514 of the upper tube 204. In some examples, the first outer diameter D1 may be 15 mm to 40 mm, and a diametrical gap between the outer surface 904 of the first portion 910 and the inner surface 514 of the upper tube 204 may be 0 mm to 1 mm. In other examples, the first diameter D1 can be larger or smaller than the above-disclosed range and/or the diametrical gap can be larger than 1 mm.

As shown in FIG. 9, the second portion 912 of the spacer 800 extends into the first bore 710 of the lower sealhead 506 and is engaged with the bumper 716. The second outer diameter D2 (FIG. 14) and the second length X2 (FIG. 14) enable the second portion 912 to be inserted into and substantially fill the first bore 710 of the lower sealhead 506. In some examples, the second portion 912 forms a slip fit or clearance fit within the lower sealhead 506. In the illustrated example, the second length X2 (FIG. 14) is sized such that the shoulder 908 of the spacer 800 remains spaced from or not engaging the first end 704 of the lower sealhead 506. However, in other examples, the second length X2 can be shortened such that the shoulder 908 of the spacer 800 engages the first end 704 of the lower sealhead 506. In the illustrated example, a transition or corner 918 between the shoulder 908 and the second portion 912 is chamfered or tapered, and the lower sealhead 506 has a chamfered or tapered edge 920 at the opening for the first bore 710 in the first end 704. In some examples, these surfaces engage each other to form a tight interface between the spacer 800 and the lower sealhead 506.

As shown in FIG. 9, the bore 914 of the spacer 800 is sized to accommodate the extension 740 of the piston 512. When the seat post 112 is in the fully extended position, the extension 740 extends into the bore 914 and a bottom 922 of the extension 740 is engaged with the bottom surface 916 in the bore 914 of the spacer 800. In some examples, the piston 512 has a chamfered or tapered corner 924 between the shoulder 738 and the extension 740, and the spacer 800 has a chambered or tapered edge 926 at the opening of the bore 914 on the first end 900 of the spacer 800. In some examples, when the piston 512 is engaged with the spacer 800, the tapered corner 924 engages the tapered edge 926. However, in other examples, these tapered surfaces may not contact each other. As disclosed above, the third length X3 (FIG. 15) between the bottom surface 916 of the bore 914 and the second end 902 of the spacer 800 defines the amount of vertical travel consumed by the spacer 800 (e.g., the reduced top-out height). This distance X3 is equal to the difference between L1 and L3 shown in FIGS. 5 and 8. The spacer 800 can be sized to have any distance X3 desired. The distance X3 can be set by a manufacturer. In some examples, the spacer 800 is sized such that the distance X3 is in the range of 10 mm to 25 mm. In other examples, the third length X3 can be in the range of 1 mm to 100 mm.

In the fully extended position shown in FIG. 9, the fluid (e.g., pneumatic gas) in the second chamber 518 fills the space below the seal 726 and between the outer side surface 730 of the piston 512 and the inner surface 514 of the upper tube 204, and the space between the shoulder 738 of the piston 512 and the first end 900 of the spacer 800. In some examples, the space between the shoulder 738 of the piston 512 and the first end 900 of the spacer 800 ensures the piston 512 does not become stuck on the first end 900 of the spacer 800. In some examples, the outer surface 904 of the first portion 910 of the spacer 800 is in tight contact with the inner surface 514 of the upper tube 204. As such, the volume of the second chamber 518 is only formed by the space above the spacer 800. However, in other examples, the interface between the spacer 800 and the inner surface 514 may be relatively loose such that fluid can fill a diametrical gap between the spacer 800 and the upper tube 204. In some examples, the spacer 800 may have one or more chamfers, bevels, radii, and/or contours to minimize negative volume fluid space. As disclosed above, it is generally desirable to keep the volume of the second chamber 518 relatively small in the fully extended position to reduce or limit movement of the upper tube 204.

Figure 10:
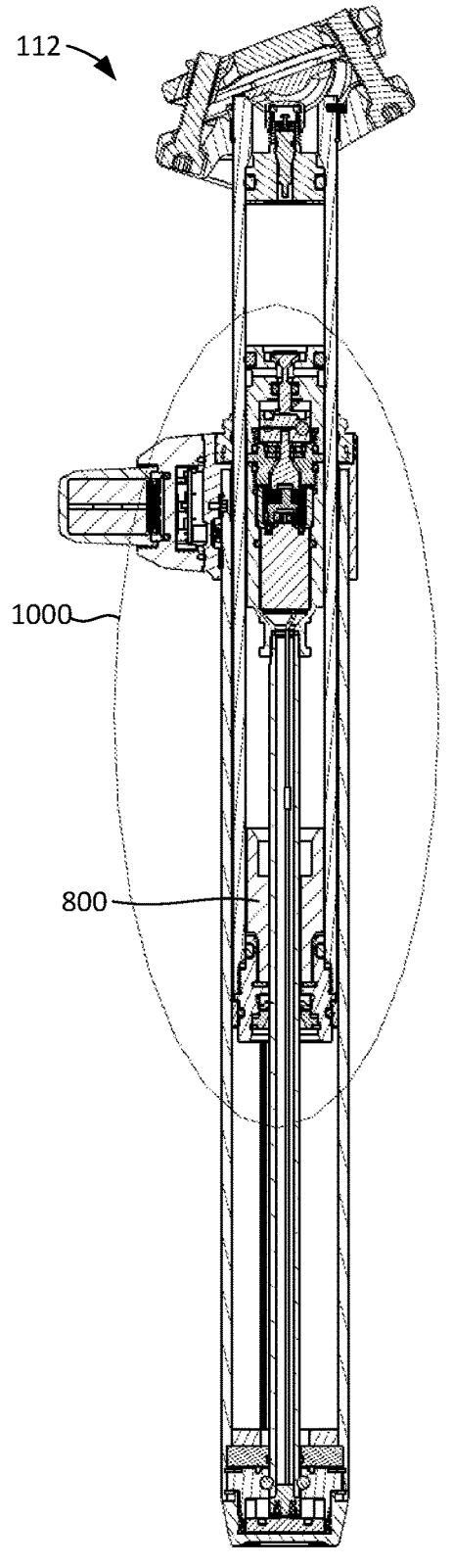
FIG. 10 shows of the example height adjustable seat post of FIG. 8 in a partially contracted position.
Figure 11:
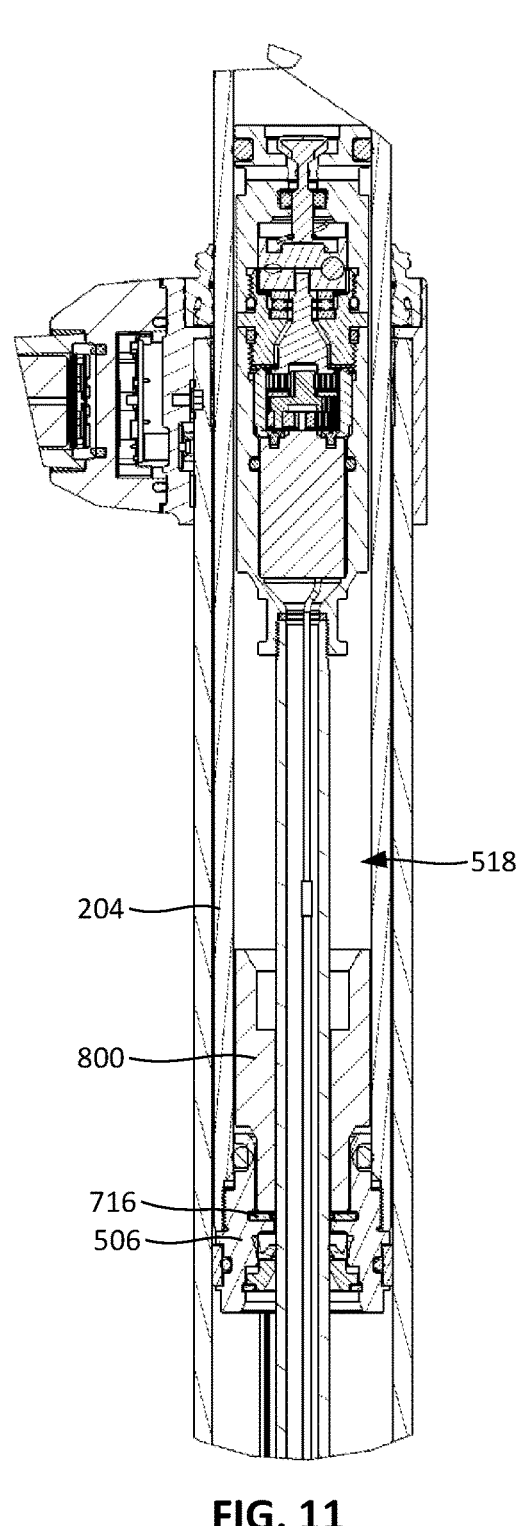
FIG. 11 is an enlarged view of the example callout of FIG. 10.

FIG. 10 shows the seat post 112 with the spacer 800 in a partially contracted position. FIG. 11 is enlarged view of the callout 1000 of FIG. 10. As disclosed above, in some examples the spacer 800 remains in the bottom portion of the second chamber 518 and engaged with the bumper 716. In some examples, the spacer 800 remains in this position due to gravity. In other words, the spacer 800 may be freely moveable (e.g., slidable) in the upper tube 804 but remains in the bottom portion because of gravity. Additionally, in some examples, the spacer 800 can be held in this position frictionally and/or mechanically. For example, the spacer 800 may be sized to form an interference fit (sometimes referred to as a friction fit) with the lower sealhead 506 and/or the upper tube 204, which maintains the spacer 800 in the position shown in FIG. 11. Additionally or alternatively, the spacer 800 can be held in this position by a mechanical coupling, such as via an o-ring, a tolerance ring, a snap ring, threaded engagement, a threaded fastener, and/or a magnet. In some examples, the seat post 112 can include a spring to bias the spacer 800 into the lower sealhead 506.

In some examples, the spacer 800 is constructed via an injection molding process. In other examples, the spacer 800 can be constructed using other manufacturing processes, such as additive manufacturing (e.g., 3D printing), machining, etc. In some examples the spacer 800 is constructed of a polymer such as polyoxymethylene (e.g., Delrin®) or polyamide. In other examples, the spacer 800 can be constructed of other materials, such as a polymer or a metal. The spacer material can be rigid, elastic, or easily deformable. In some examples, the spacer 800 can have surface features such as molded, laser marked, pad printed, etc. text and/or pictures of a description of its size, part identification, and/or installation orientation or instructions.

The spacer 800 can be constructed to any length to achieve the desired top-out height. For example, the spacer 800 can be sized such that the length X3 is 10 mm, 20 mm, 30 mm, etc. In some examples, the seat post 112 can be sold with multiple spacers of different sizes as an apparatus, kit, or assembly. Then the user can selected the desired spacer to achieve their desired top-out height.

Figure 16:
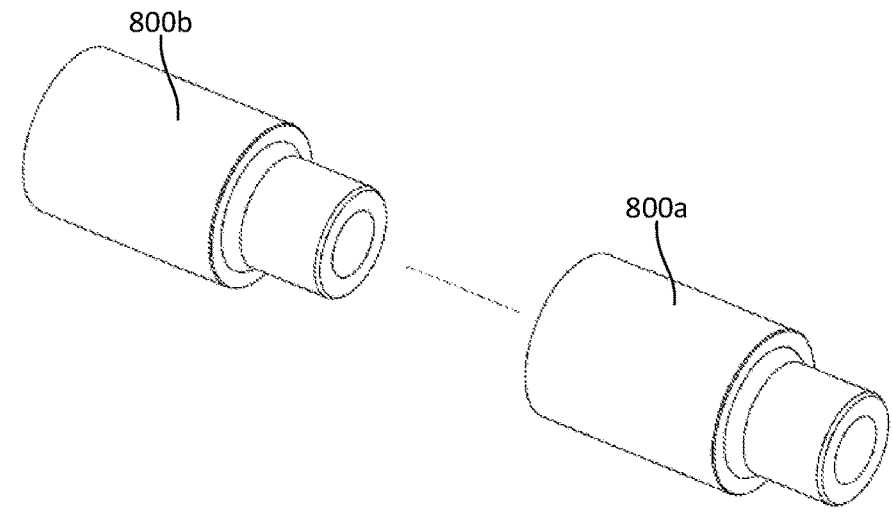
FIG. 16 is a perspective view of two example spacers that can be installed in the example height adjustable seat post of FIG. 8.
Figure 17:
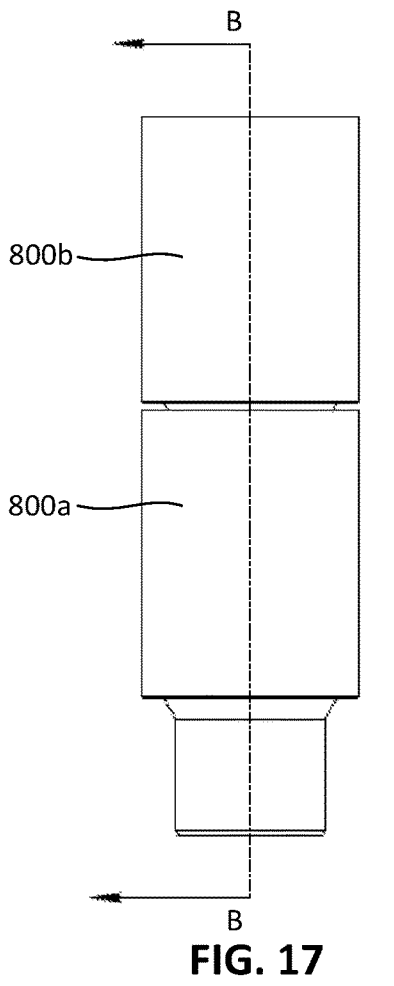
FIG. 17 is a side view of the two example spacers of FIG. 16 in a stacked configuration.

In some examples, the seat post 112 can include multiple spacers in a stacked arrangement. For example, FIG. 15 shows two example spacers, including a first spacer 800a and a second spacer 800b. The parts of the spacers 800a, 800b are numbered the same as disclosed above in connection with FIGS. 8-15 but with a corresponding 'a' or 'b'. The second spacer 800b can be added to further reduce the length of the seat post 112 in the fully extended position. FIG. 16 is a side view of the two spacers 800a, 800b in a stacked arrangement or configuration. FIG. 17 is a cross-sectional view of FIG. 16 taken along lines B-B. As shown in FIG. 17, the first and second spacers 800a, 800b are stacked such that the second portion 910b of the second spacer 800b extends into the bore 914a of the first spacer 800a and is engaged with the bottom surface 916a of the bore 914a. As such, the first and second spacers 800a, 800b are nested. In some examples, the first and second spacers 800a, 800b are held in this nest position due to gravity, but can also be held together frictionally or mechanically (e.g., via an o-ring, a tolerance ring, a snap ring, threaded engagement, a threaded fastener, a magnet) and/or include a spring to bias the stack toward the lower sealhead 506. In some examples, the seat post 112 can include a spring to bias the spacer 800 into the lower sealhead 506. The first and second spacers 800a, 800b can be installed in the second chamber 518 and stacked in the axial configuration shown in FIGS. 16 and 17. In this example, a fourth height X4 is defined between the bottom surface 916b of the second spacer 800b (the top spacer) and the send end 902a of the first spacer 800a (the bottom spacer). The fourth height X4 corresponds to the reduced top-out height of the seat post 112. In some examples, one or more additional spacers can be stacked on top of the second spacer 800b. In some examples, the first and second spacers 800a, 800b (and/or any additional spacers) have a same size and shape. In such an example, the fourth length X4 corresponds to double the third length X3 (FIG. 15). A user can arrange two more of the spacers together to achieved the desired top-out height. For example, each of the spacers may have a third length X3 (FIG. 15) of 10 mm. If it is desired to reduce the top-out height by 40 mm, the user can stack four of the spacers together. In other examples, the first and second spacers 800a, 800b (and/or the additional spacers) can have different sizes and shapes. In some examples, the one or more spacers may be pre-installed in the seat post 112. In other examples, the seat post 112 (without a spacer installed) can be sold as an apparatus, kit, or assembly with one or more spacers and/or the spacer(s) can be sold separately from the seat post 112. The user or rider can disassemble the seat post 112 and install one or more of the spacers to achieve their desired top-out height.

Figure 18:
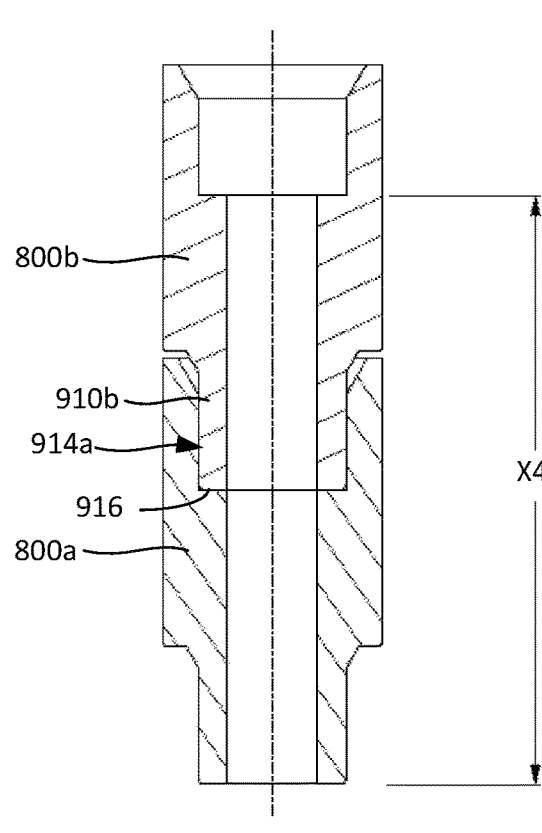
FIG. 18 is a cross-sectional view of the two example spacers of FIG. 17 taken along line B-B.
Figures 19, 20:
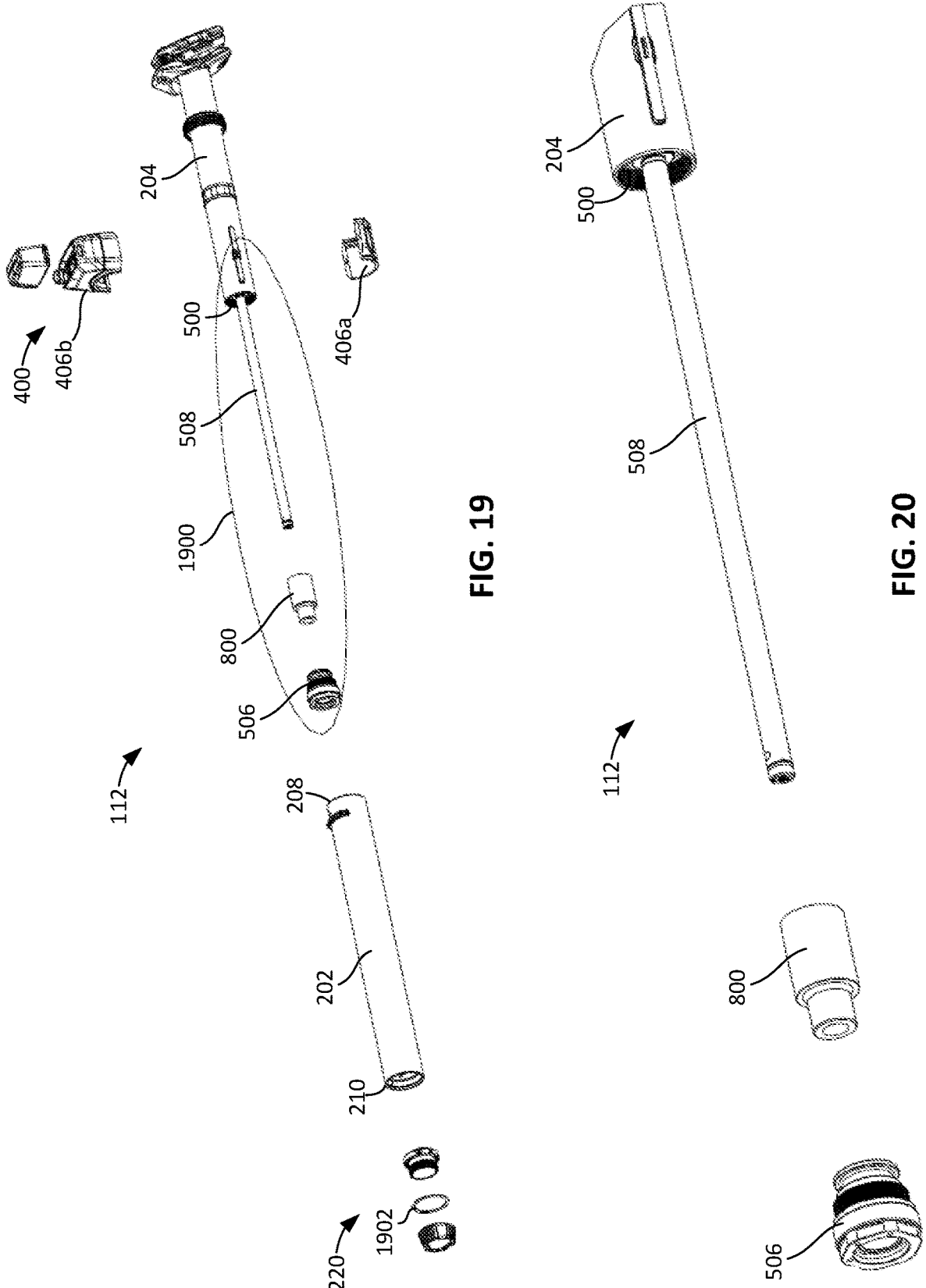
FIG. 19 is a partially exploded view of the example height adjustable seat post of FIG. 8.
FIG. 20 is an enlarged view of the callout of FIG. 19.

FIG. 19 is a partially exploded view of the seat post 112 of FIG. 8 with one spacer 800, and FIG. 20 is an enlarged view of the callout 1900 of FIG. 19. An example method or process of installing or assembling the spacer 800 in the seat post 112 is described in connection with FIGS. 19 and 20. First, the valve 520 (FIG. 5) is switched to the open state and the valve 523 (FIG. 5) is used to depressurize or remove fluid from the first and second chambers 516, 518 (FIG. 5). Next, the collar 400 is removed by disconnecting the first and second portions 406a, 406b, such as by removing one or more threaded fasteners (e.g., screws, bolts). Next, the lower cap assembly 220 is removed from the lower tube 202 by removing a circlip 1902 and pushing the upper tube 204 and the shaft 508 further into the lower tube 202. Next, fasteners are removed from the lower cap assembly 200 to detach it from the shaft 508. Next, the upper tube 204 is pulled out of the lower tube 202, exposing the lower sealhead 506. The lower sealhead 1902 shown is threaded into the upper tube 204 with a hex external interface. The lower sealhead 506 is unthreaded from the lower end 500 of upper tube 204. In some examples, the upper tube 204 may have its own internal around the Schrader valve or external wrench interface to counteract the unthreading action of the lower sealhead 506. The lower sealhead 506 is removed from the shaft 508. Next, the spacer 800 or multiple spacers (e.g., the first and second spacers 800a, 800b of FIG. 16) are slid onto the shaft 508 leading with the first outer diameter D1 (FIG. 14). All steps are then reversed to re-assemble the seat post 112. The seat post 112 now has a reduced top-out height by dimension X3 (FIG. 15) or X4 (FIG. 18).

In addition to or as an alternative to the spacer 800 installed in the second chamber 518, the seat post 112 can include one or more spacers in other locations. For example, FIG. 21 shows an example of the seat post 112 including a spacer 2100 in the third chamber 526 in the lower tube 202. In this example, the spacer 2100 reduces the amount that the seat post 112 can be contracted. In the illustrated example, the spacer 2100 is disposed on the shaft 508, between the lower sealhead 506 and lower cap assembly 220. When the seat post 112 is contracted or compressed, the upper tube 204 with the lower sealhead 506 moves downward and eventually engages the spacer 2100, which defines or forms the fully contracted (bottom-out) position. The spacer 2100 limits or reduces the amount of travel. In some examples, the spacer 2100 remains in the bottom of the third chamber 526 and engaged with the lower cap assembly 220. The spacer 2100 may be disc-shaped with a central opening to receive the shaft 508. The spacer 2100 can be constructed of any of the same materials disclosed herein in connection with the spacer 800. The spacer 2100 can be used simultaneously with one or more of the spacers 800, or can be used independently of the spacers 800.

FIG. 22 shows another example in which the seat post 112 includes a spacer 2200 in the first chamber 516 in the upper tube 204, between the piston assembly 510 and the upper sealhead 504. When the seat post 112 is contracted or compressed, the upper tube 204 with the upper sealhead 504 moves downward and eventually the spacer 2200 engages the top of the piston assembly 510, which defines or forms the fully contracted (bottom-out) position. The spacer 2200 limits or reduces the amount of travel. The spacer 2200 may be disc-shaped. The spacer 2100 can be constructed of any of the same materials disclosed herein in connection with the spacer 800. The spacer 2200 can be used simultaneously with one or more of the spacer 800 and/or the spacer 2100, or can be used independently of the spacers 800, 2100.

While the example seat posts are disclosed as having a pneumatic platform, the example seat posts can also be used in connection with hydraulic platforms. For example, instead of having pneumatic chambers filled with pressurized gas, the chambers 516, 518 can be filled with a hydraulic fluid, such as oil. Therefore, the examples disclosed herein can be used in connection with valves for compressible or incompressible fluids. Also, while the examples disclosed herein utilize a battery in the control module as the power supply to activate the motor, in other examples, the motor can be activated from another power supply, such as an electric bicycle battery or from another battery attached to the bicycle.

The example spacers disclosed herein can also be used in other types of bicycle components. For example, any of the example spacers can be used in suspension components (e.g., a shock absorber, a front fork). A suspension component often includes first and second tubes arranged in a telescopic arrangement. The example spacers disclosed herein can be similar inserted into a chamber in the first or second tubes and used to reduce the height in the top-out position and/or reduce the bottom-out stroke length.

Example systems, apparatus, method, and articles of manufacture for bicycles (and/or other vehicles) are disclosed herein. Examples and combinations of examples disclosed herein include the following:

Example 1 is a height adjustable seat post for a bicycle. The height adjustable seat post comprises an upper tube to be coupled to a seat. The upper tube has an upper end and a lower end opposite the upper end. The height adjustable seat post includes a lower tube to be coupled to a frame of the bicycle. The upper tube and the lower tube are configured in a telescopic arrangement and moveable between at least a first position and a second position. The height adjustable seat post includes an upper sealhead coupled to the upper tube at or near the upper end, a lower sealhead coupled to the upper tube at or near end of the lower end, a shaft coupled to the lower tube and extending through the lower sealhead and into the upper tube, and a piston in the upper tube, the piston coupled to the shaft. The piston divides the upper tube into a first chamber between the piston and the upper sealhead and a second chamber between the piston and the lower sealhead. The height adjustable seat post also includes a spacer in the second chamber between the piston and the lower sealhead to reduce a length of the height adjustable seat post in at least one of the first and second positions.

Example 2 includes the height adjustable seat post of Example 1, wherein the spacer has a first end, a second end opposite the first end, and an outer surface. The outer surface of the spacer has a shoulder. The spacer has a first portion with a first outer diameter between the first end and the shoulder and a second portion with a second outer diameter between the shoulder and the second end. The second outer diameter is less than the first outer diameter.

Example 3 includes the height adjustable seat post of Example 2, wherein the lower sealhead has a first end and a second end opposite the first end, the first end of the lower sealhead is facing the second chamber, and the lower sealhead has a bore extending into the first end of the lower sealhead.

Example 4 includes the height adjustable seat post of Example 3, wherein the first portion of the spacer is disposed above the first end of the lower sealhead, and the second portion of the spacer extends into the bore in the first end of the lower sealhead.

Example 5 includes the height adjustable seat post of Example 4, wherein the first outer diameter is sized to form a transition fit between the outer surface of the first portion of the spacer and an inner surface of the upper tube.

Example 6 includes the height adjustable seat post of Examples 4 or 5, further including a bumper disposed in the bore in the lower sealhead. The second end of the spacer is engaged with the bumper.

Example 7 includes the height adjustable seat post of any of Examples 1-6, wherein the spacer has a first end and a second end opposite the first end, the first end is facing the second chamber, and wherein the spacer has a bore extending into a first end of the spacer.

Example 8 includes the height adjustable seat post of Example 7, wherein a distance between a bottom surface of the bore and the second end of the spacer corresponds to a length of the height adjustable seat post in the fully extended position reduced by the spacer.

Example 9 includes the height adjustable seat post of Example 8, wherein the piston has a shoulder and an extension extending from the shoulder, and wherein, when the height adjustable seat post is in the fully extended position, the extension of the piston extends into the bore of the spacer and is engaged with the bottom surface of the bore.

Example 10 includes the height adjustable seat post of Example 9, wherein, when the height adjustable seat post is in the fully extended position, the shoulder of the piston is spaced from the first end of the spacer.

Example 11 includes the height adjustable seat post of any of Examples 7-10, wherein the spacer has a tapered edge at an opening of the bore on the first end of the spacer.

Example 12 includes the height adjustable seat post of any of Examples 1-11, wherein the shaft extends through a central channel in the spacer, and wherein the shaft is slidable in the central channel in the spacer.

Example 13 includes the height adjustable seat post of any of Examples 1-12, wherein the spacer is a first spacer, further including a second spacer in the second chamber to further reduce the length of the height adjustable seat post.

Example 14 includes the height adjustable seat post of Example 13, wherein the first spacer and the second spacer are stacked in an axial configuration in the second chamber.

Example 15 includes the height adjustable seat post of Example 14, wherein the first spacer and the second spacer have a same size and shape.

Example 16 includes the height adjustable seat post of any of Examples 1-15, wherein the first position is a fully extended position and the second position is a fully contracted position.

Example 17 includes the height adjustable asset post of any of Examples 1-16, wherein the upper sealhead includes a valve.

Example 18 is an apparatus for a bicycle. The apparatus comprises a height adjustable seat post including an upper tube and a lower tube configured in a telescopic arrangement and moveable between at least a first position and a second position. The upper tube extends outward from the lower tube a first length in the first position. The height adjustable seat post includes a lower sealhead in the upper tube at or near the lower end, a shaft coupled to the lower tube and extending through the lower sealhead and into the upper tube, and a piston in the upper tube, the piston coupled to the shaft. The piston divides the upper tube into a first chamber and a second chamber. The second chamber is defined between the piston and the lower sealhead. The apparatus also includes a spacer having a first end, a second end, and a central channel extending between the first and second ends. The spacer is sized to be installed in the second chamber of the height adjustable seat post with the shaft extending through the central channel, and wherein, when the spacer is installed in the second chamber of the height adjustable seat post, the upper tube extends outward from the lower tube a second length in the first position, the second length being less than the first length.

Example 19 includes the apparatus of Example 18, wherein an outer surface of the spacer has a shoulder. The spacer has a first portion with a first outer diameter between the first end and the shoulder and a second portion with a second outer diameter between the shoulder and the second end. The second outer diameter is less than the first outer diameter.

Example 20 includes the apparatus of Example 19, wherein the lower sealhead has a first end and a second end opposite the first end. The first end faces the second chamber. The spacer has a bore extending into the first end, and wherein the second portion of the spacer is sized to be inserted into the bore of the lower sealhead.

Example 21 includes the apparatus of Example 20, wherein the first outer diameter is sized to form a transition fit between the outer surface of the first portion of the spacer and an inner surface of the upper tube when the spacer is installed in the second chamber.

Example 22 includes the apparatus of any of Examples 18-21, wherein the spacer is a first spacer. The apparatus further includes a second spacer to be installed in the second chamber, and wherein the first spacer and the second spacer have a same size and shape.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A height adjustable seat post for a bicycle, the height adjustable seat post comprising:
   an upper tube to be coupled to a seat, the upper tube having an upper end and a lower end opposite the upper end;
   a lower tube to be coupled to a frame of the bicycle, the upper tube and the lower tube configured in a telescopic arrangement and moveable between at least a first position and a second position;
   an upper sealhead coupled to the upper tube at or near the upper end;
   a lower sealhead coupled to the upper tube at or near end of the lower end;
   a shaft coupled to the lower tube and extending through the lower sealhead and into the upper tube;
   a piston in the upper tube, the piston coupled to the shaft, the piston dividing the upper tube into a first chamber between the piston and the upper sealhead and a second chamber between the piston and the lower sealhead; and
   a spacer in the second chamber between the piston and the lower sealhead to provide a first length of the height adjustable seat post in at least one of the first or second positions, the first length being less than a second length of the height adjustable seat post without the spacer in the same of the at least one of the first or second positions.

2. The height adjustable seat post of claim 1, wherein the spacer has a first end, a second end opposite the first end, and an outer surface, wherein the outer surface of the spacer has a shoulder, the spacer having a first portion with a first outer diameter between the first end and the shoulder and a second portion with a second outer diameter between the shoulder and the second end, the second outer diameter being less than the first outer diameter.

3. The height adjustable seat post of claim 2, wherein the lower sealhead has a first end and a second end opposite the first end, the first end of the lower sealhead facing the second chamber, the lower sealhead having a bore extending into the first end of the lower sealhead.

4. The height adjustable seat post of claim 3, wherein the first portion of the spacer is disposed above the first end of the lower sealhead, and the second portion of the spacer extends into the bore in the first end of the lower sealhead.

5. The height adjustable seat post of claim 4, wherein the first outer diameter is sized to form a transition fit between the outer surface of the first portion of the spacer and an inner surface of the upper tube.

6. The height adjustable seat post of claim 4, further including a bumper disposed in the bore in the lower sealhead, the second end of the spacer engaged with the bumper.

7. The height adjustable seat post of claim 1, wherein the spacer has a first end and a second end opposite the first end, the first end facing the second chamber, and wherein the spacer has a bore extending into a first end of the spacer.

8. The height adjustable seat post of claim 7, wherein a distance between a bottom surface of the bore and the second end of the spacer corresponds to a difference between the first length and the second length.

9. The height adjustable seat post of claim 8, wherein the piston has a shoulder and an extension extending from the shoulder, and wherein, when the height adjustable seat post is in the fully extended position, the extension of the piston extends into the bore of the spacer and is engaged with the bottom surface of the bore.

10. The height adjustable seat post of claim 9, wherein, when the height adjustable seat post is in the fully extended position, the shoulder of the piston is spaced from the first end of the spacer.

11. The height adjustable seat post of claim 7, wherein the spacer has a tapered edge at an opening of the bore on the first end of the spacer.

12. The height adjustable seat post of claim 1, wherein the shaft extends through a central channel in the spacer, and wherein the shaft is slidable in the central channel in the spacer.

13. The height adjustable seat post of claim 1, wherein the spacer is a first spacer, further including a second spacer in the second chamber to provide a third length of the height adjustable seat post, wherein the third length is less than the first length in the same of the at least one of the first or second positions.

14. The height adjustable seat post of claim 13, wherein the first spacer and the second spacer are stacked in an axial configuration in the second chamber.

15. The height adjustable seat post of claim 14, wherein the first spacer and the second spacer have a same size and shape.

16. The height adjustable seat post of claim 1, wherein the first position is a fully extended position and the second position is a fully contracted position.

17. The height adjustable seat post of claim 1, wherein the upper sealhead includes a valve.

18. An apparatus for a bicycle, the apparatus comprising:
a height adjustable seat post including:
an upper tube and a lower tube configured in a telescopic arrangement and moveable between at least a first position and a second position, the upper tube extending outward from the lower tube a first length in the first position;
a lower sealhead in the upper tube at or near the lower end;
a shaft coupled to the lower tube and extending through the lower sealhead and into the upper tube; and
a piston in the upper tube, the piston coupled to the shaft, the piston dividing the upper tube into a first chamber and a second chamber, the second chamber defined between the piston and the lower sealhead; and
a spacer having a first end, a second end, and a central channel extending between the first and second ends, the spacer sized to be installed in the second chamber of the height adjustable seat post with the shaft extending through the central channel, and wherein, when the spacer is installed in the second chamber of the height adjustable seat post, the upper tube extends outward from the lower tube a second length in the first position, the second length being less than the first length.

19. The apparatus of claim 18, wherein an outer surface of the spacer has a shoulder, the spacer having a first portion with a first outer diameter between the first end and the shoulder and a second portion with a second outer diameter between the shoulder and the second end, the second outer diameter being less than the first outer diameter.

20. The apparatus of claim 19, wherein the lower sealhead has a first end and a second end opposite the first end, the first end facing the second chamber, the spacer having a bore extending into the first end, and wherein the second portion of the spacer is sized to be inserted into the bore of the lower sealhead.

21. The apparatus of claim 20, wherein the first outer diameter is sized to form a transition fit between the outer surface of the first portion of the spacer and an inner surface of the upper tube when the spacer is installed in the second chamber.

22. The apparatus of claim 18, wherein the spacer is a first spacer, the apparatus further including a second spacer to be installed in the second chamber, wherein the first spacer and the second spacer have a same size and shape.

* * * * *